United States Patent
Bai et al.

(10) Patent No.: US 9,792,372 B2
(45) Date of Patent: Oct. 17, 2017

(54) USING EXOGENOUS SOURCES FOR PERSONALIZATION OF WEBSITE SERVICES

(71) Applicant: Yahoo Holdings, Inc., Sunnyvale, CA (US)

(72) Inventors: Xiao Bai, Barcelona (ES); B. Barla Cambazoglu, Barcelona (ES); Francesco Gullo, Barcelona (ES); Amin Mantrach, Barcelona (ES); Fabrizio Silvestri, Barcelona (ES)

(73) Assignee: Yahoo Holdings, Inc., Sunnyvale, CA (US)

( * ) Notice: Subject to any disclaimer, the term of this patent is extended or adjusted under 35 U.S.C. 154(b) by 205 days.

(21) Appl. No.: 14/504,386

(22) Filed: Oct. 1, 2014

(65) Prior Publication Data
US 2016/0012055 A1    Jan. 14, 2016

Related U.S. Application Data

(60) Provisional application No. 62/023,821, filed on Jul. 11, 2014.

(51) Int. Cl.
*G06F 17/30* (2006.01)
*G06Q 50/00* (2012.01)

(52) U.S. Cl.
CPC .. *G06F 17/30867* (2013.01); *G06F 17/30029* (2013.01); *G06F 17/3053* (2013.01); *G06F 17/30522* (2013.01); *G06F 17/30699* (2013.01); *G06F 17/30873* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,719,347 | B1* | 5/2014 | Tomkins | G06F 17/30041 709/204 |
| 9,015,151 | B1* | 4/2015 | Margulis | G06Q 30/0269 705/14.52 |
| 2009/0234784 | A1* | 9/2009 | Buriano | G06F 17/30035 706/12 |
| 2010/0100607 | A1* | 4/2010 | Scholz | G06F 17/30702 709/219 |
| 2012/0054278 | A1* | 3/2012 | Taleb | G06Q 50/01 709/204 |

(Continued)

*Primary Examiner* — Bruce Moser
(74) *Attorney, Agent, or Firm* — Martine Penilla Group, LLP

(57) ABSTRACT

Software running on servers at a website hosting a news service generates a first profile for a user of the news service. The first profile is based at least in part on implicit relevance feedback from the user on content presented by the news service. The software obtains a second profile for the user from a web-searching service. The software creates a score for a candidate item of content. The score is based on similarity of the candidate item to the first profile and similarity of the candidate item to the second profile. Similarity to the second profile measures at least similarity to a plurality of web-search queries and similarity to any titles of any search results resulting from each of the queries. The software then presents the item of content to the user in a content stream served by the news service, based on the score.

20 Claims, 19 Drawing Sheets

(56) References Cited

U.S. PATENT DOCUMENTS

| | | | | |
|---|---|---|---|---|
| 2012/0317123 A1* | 12/2012 | Green | ............... | G06F 17/30867 |
| | | | | 707/748 |
| 2012/0317198 A1* | 12/2012 | Patton | .................... | G06Q 10/10 |
| | | | | 709/204 |
| 2013/0031172 A1* | 1/2013 | Olsen | ....................... | H04L 51/28 |
| | | | | 709/204 |
| 2014/0067828 A1* | 3/2014 | Archibong | .......... | H04L 65/4084 |
| | | | | 707/748 |

* cited by examiner

US 9,792,372 B2

USING EXOGENOUS SOURCES FOR PERSONALIZATION OF WEBSITE SERVICES

RELATED APPLICATION

This application claims the benefit of and/or priority to U.S. Provisional Patent Application No. 62/023,821, entitled "Using Exogenous Sources for Personalization of Services at a Website", filed on Jul. 11, 2014. The disclosure of that provisional application is incorporated herein by reference for all purposes.

BACKGROUND

Facebook, Twitter, Google+, and other social networking websites present items of content including text, images, and videos to their users using a content stream that is in reverse-chronological order (e.g., with the topmost item in the stream being the last in time) or ordered according to an interestingness algorithm (e.g. with the topmost item in the stream having the highest interestingness score according to the algorithm) and/or a personalization algorithm.

Such content streams are now also being used by websites such as Yahoo! and Google that include multiple services such as a news service and a web-search service. Personalization of these content streams tends to be based on content-based filtering (e.g., using implicit relevance feedback such as click-throughs, click-ons, mouse-overs, or mouse-hovers on news articles), collaborative filtering using profiles of similar users, and/or a hybrid of the two.

SUMMARY

In an example embodiment, a processor-executed method is described. According to the method, software running on servers at a website hosting a news service generates a first profile for a user of the news service. The first profile is based at least in part on implicit relevance feedback from the user on content presented by the news service. The software obtains a second profile for the user from a web-searching service. The second profile is based on a query log and includes a plurality of queries by the user during a specified period of time and any search results resulting from each of the plurality of queries. The software creates a score for a candidate item of content. The score is based at least in part on similarity of the candidate item to the first profile and similarity of the candidate item to the second profile. Similarity to the second profile measures at least similarity to each of the queries and similarity to any titles of any search results resulting from each of the queries. The software then presents the item of content to the user in a content stream served by the news service, based at least in part on the score.

In another example embodiment, an apparatus is described, namely, computer-readable media which persistently store a program that runs on servers at a website hosting a news service. The program generates a first profile for a user of the news service. The first profile is based at least in part on implicit relevance feedback from the user on content presented by the news service. The program obtains a second profile for the user from a web-searching service. The second profile is based on a query log and includes a plurality of queries by the user during a specified period of time and any search results resulting from each of the plurality of queries. The program creates a score for a candidate item of content. The score is based at least in part on similarity of the candidate item to the first profile and similarity of the candidate item to the second profile. Similarity to the second profile measures at least similarity to each of the queries and similarity to any titles of any search results resulting from each of the queries. The program then presents the item of content to the user in a content stream served by the news service, based at least in part on the score.

Another example embodiment also involves a processor-executed method. According to the method, software running on servers at a website hosting a social-networking service generates a first profile for a user of the social-networking service. The first profile is based at least in part on implicit relevance feedback from the user on content presented by the social-networking service. The software obtains a second profile for the user from a web-searching service. The second profile is based on a query log and includes a plurality of queries by the user during a specified period of time and any search results resulting from each of the plurality of queries. The software creates a score for a candidate item of content. The score is based at least in part on similarity of the candidate item to the first profile and similarity of the candidate item to the second profile. Similarity to the second profile measures at least similarity to each of the queries and similarity to any titles of any search results resulting from each of the queries. The software then presents the item of content to the user in a content stream served by the social-networking service, based at least in part on the score.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1A:
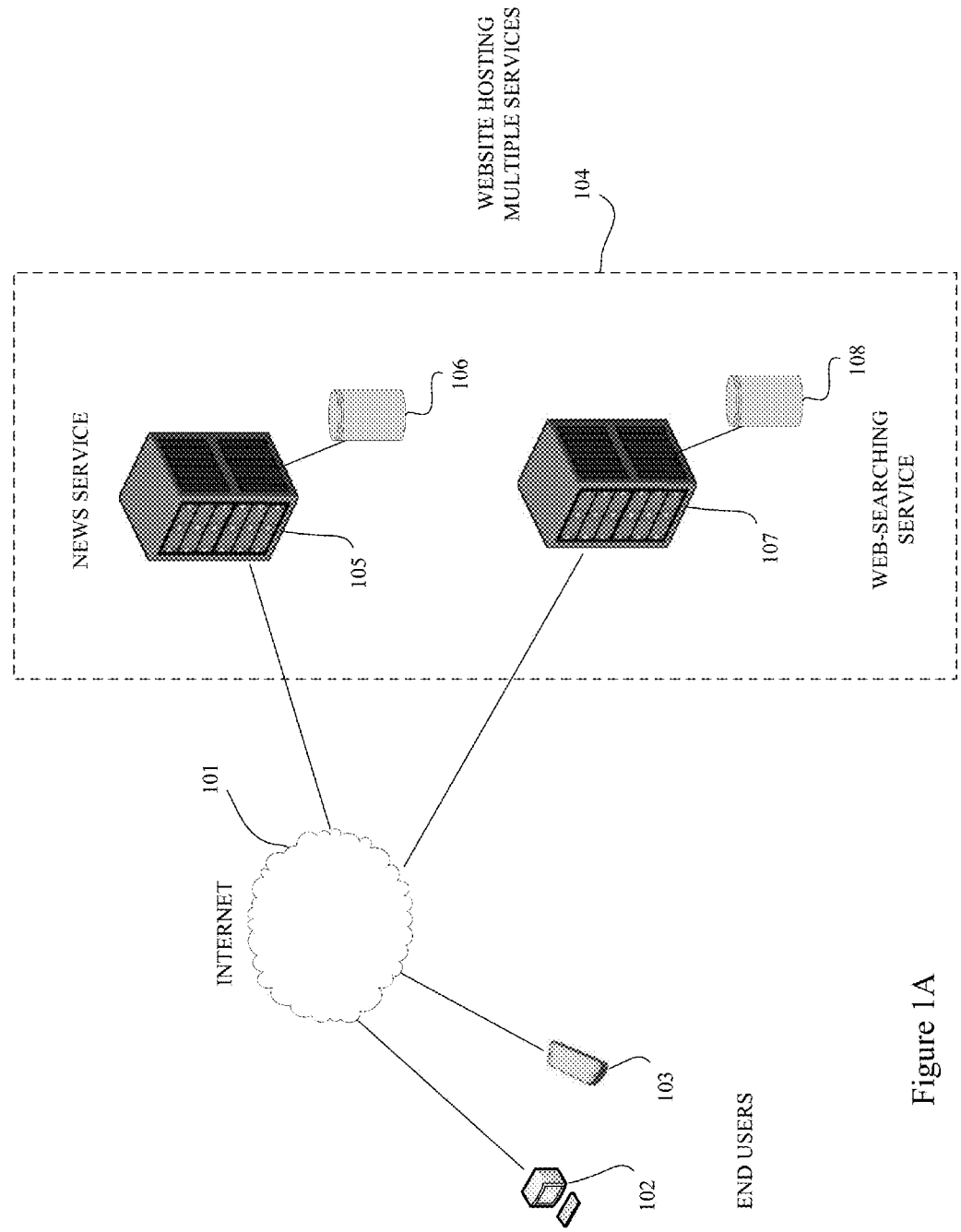
FIG. 1A is a network diagram showing a website hosting multiple services including a news service, in accordance with an example embodiment.

FIG. 1A is a network diagram showing a website hosting multiple services including a news service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting multiple services, including, e.g., a news service 105 and a web-searching service 107. In an example embodiment, website 104 might be a website such as Yahoo! or Google.

In an example embodiment, news service 105 and web-searching service 107 might include a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, Docker, etc. The servers in website 105 might be connected to persistent storage 106 and the servers at website 107 might be connected to persistent storage 108. Persistent storages 106 and 108 might include flash memory, a redundant array of independent disks (RAID), and/or a storage area network (SAN), in an example embodiment. In an alternative example embodiment, the servers for websites 105 and 107 and/or the persistent storage in persistent storages 106 and 108 might be hosted wholly or partially in a public and/or private cloud, e.g., where the cloud resources serve as a platform-as-a-service (PaaS) or an infrastructure-as-a-service (IaaS).

Persistent storage 106 might be used to store content (e.g., text including web links, images, videos, animations, audio recordings, games and other software, etc.) and/or its related data. Additionally, persistent storage 106 might be used to store data related to users and their social contacts (e.g., Facebook friends), as well as software including algorithms and other processes for presenting the content to the users in a personalized content stream (e.g., as displayed on the front page of Yahoo! News) which might be ordered from top to bottom (a) in reverse chronology (e.g., latest in time on top), or (b) according to an interestingness algorithm adjusted by the personalization processes described in further detail below. In an example embodiment, some of the content (and/or its related data) stored in persistent storage 106 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storage 106.

It will be appreciated that news service 104 might have social features based on a friend list, contact list, buddy list, social graph, interest graph, distribution list, or other control list that is accessed over the network from a social-networking website through an application programming interface (API) exposed by the social-networking website. For example, Yahoo! News might identify items in a personalized content stream (e.g., as displayed on the front page of Yahoo! News) that have been viewed/read by a user's friends, as listed on a Facebook friend list that the user has authorized Yahoo! News to access.

Similarly, persistent storage 108 might be used to store content (e.g., text including web links, images, videos, animations, audio recordings, games and other software, etc.) and/or its related data, including indexed web links (e.g., uniform resource locators or URLs) collected by web crawlers presented as search results. Additionally, personal storage 108 might be used to store data related to users including data related to implicit relevance feedback (e.g., click-throughs, click-ons, mouse-overs, mouse-hovers, etc.), as well as software including algorithms and other processes for presenting ordered search results (e.g., web links) to users based on (a) measures of graph centrality (e.g., PageRank) and/or (b) data related to users, including stored data related to implicit relevance feedback.

Personal computer 102 and the servers at websites 105 and 107 might include (1) hardware consisting of one or more central processing units (CPUs)/microprocessors (e.g., from the x86 family, the ARM family, or the PowerPC family) and/or graphics processing units (GPUs), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more central processing units (CPUs)/microprocessors (e.g., from the ARM family or the x86 family) and/or graphics processing units (GPUs), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, and/or a global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access services 105 and 107. Alternatively, users of personal computer 102 and/or mobile device 103 might use application programs (or apps, including hybrid apps that display HTML content) to access services 105 and 107.

Figure 1B:
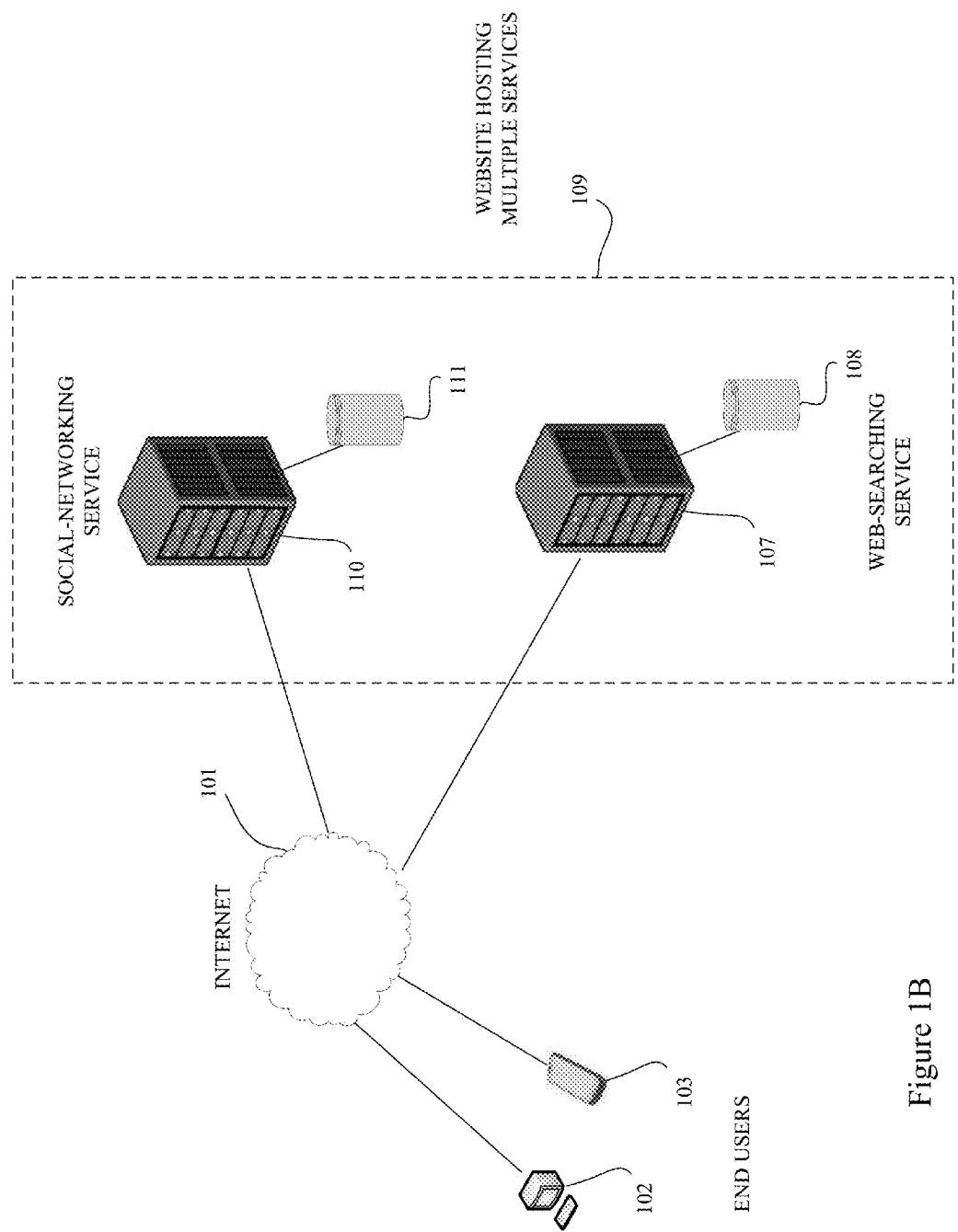
FIG. 1B is a network diagram showing a website hosting multiple services including a social-networking service, in accordance with an example embodiment.

FIG. 1B is a network diagram showing a website hosting multiple services including a social-networking service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 109 hosting multiple services, including, e.g., a social-networking service 110 and a web-searching service 107. In an example embodiment, website 109 might be a website such as Facebook (whose Graph Search serves search results provided by Microsoft Bing) or Google+.

As used here and elsewhere in this disclosure, the term "social-networking service" is to be broadly interpreted to include, for example, any online service, including a social-media service, that allows its users to, among other things, (a) selectively access (e.g., according to a friend list, contact list, buddy list, social graph, interest graph, or other control list) content (e.g., text including web links, images, videos, animations, audio recordings, games and other software, etc.) associated with each other's profiles (e.g., Facebook walls, Flickr photo albums, Pinterest boards, etc.); (b) selectively broadcast (e.g., according to a friend list, contact list, buddy list, social graph, interest graph, distribution list, or other control list) content (e.g., text including web links, images, videos, animations, audio recordings, games and other software, etc.) to each other's newsfeeds (e.g., content/activity streams such as Facebook's News Feed, Twitter's Timeline, Google+'s Stream, etc.); and/or (c) selectively communicate (e.g., according to a friend list, contact list, buddy list, social graph, interest graph, distribution list, or other control list) with each other (e.g., using a messaging protocol such as email, instant messaging (IM), short message service (SMS), etc.).

In an example embodiment, social-networking service 110 and web-searching service 107 might include a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, Docker, etc. The servers in website 110 might be connected to persistent storage 111 and the servers at website 107 might be connected to persistent storage 108. Persistent storages 111 and 108 might include flash memory, a redundant array of independent disks (RAID), and/or a storage area network (SAN), in an example embodiment. In an alternative example embodiment, the servers for websites 110 and 107 and/or the persistent storage in persistent storages 111 and 108 might be hosted wholly or partially in a public and/or private cloud, e.g., where the cloud resources serve as a platform-as-a-service (PaaS) or an infrastructure-as-a-service (IaaS).

Persistent storage 111 might be used to store content (e.g., text including web links, images, videos, animations, audio recordings, games and other software, etc.) and/or its related data. Additionally, persistent storage 111 might be used to store data related to users and their social contacts (e.g., Facebook friends), as well as software including algorithms and other processes for presenting the content to the users in a personalized content stream which might be ordered from top to bottom (a) in reverse chronology (e.g., latest in time on top), or (b) according to an interestingness algorithm (e.g., EdgeRank) adjusted by the personalization processes described in further detail below. In an example embodiment, some of the content (and/or its related data) stored in persistent storage 111 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storage 111.

Similarly, persistent storage 108 might be used to might be used to store content (e.g., text including web links, images, videos, animations, audio recordings, games and other software, etc.) and/or its related data, including indexed web links collected by web crawlers presented as search results. Additionally, personal storage 108 might be used to store data related to users including data related to implicit relevance feedback (e.g., click-throughs, click-ons, mouse-overs, mouse-hovers, etc.), as well as software including algorithms and other processes for presenting ordered search results (e.g., web links) to users based on (a) measures of graph centrality (e.g., PageRank) and/or (b) data related to users, including stored data related to implicit relevance feedback.

Here again, in an example embodiment, personal computer 102 and mobile device 103 might each include a browser as an application program or as part of an operating system. It will be appreciated that users of personal computer 102 and/or mobile device 103 might use browsers to access services 110 and 107. Alternatively, users of personal computer 102 and/or mobile device 103 might use application programs (or apps, including hybrid apps that display HTML content) to access services 110 and 107.

Figure 2:
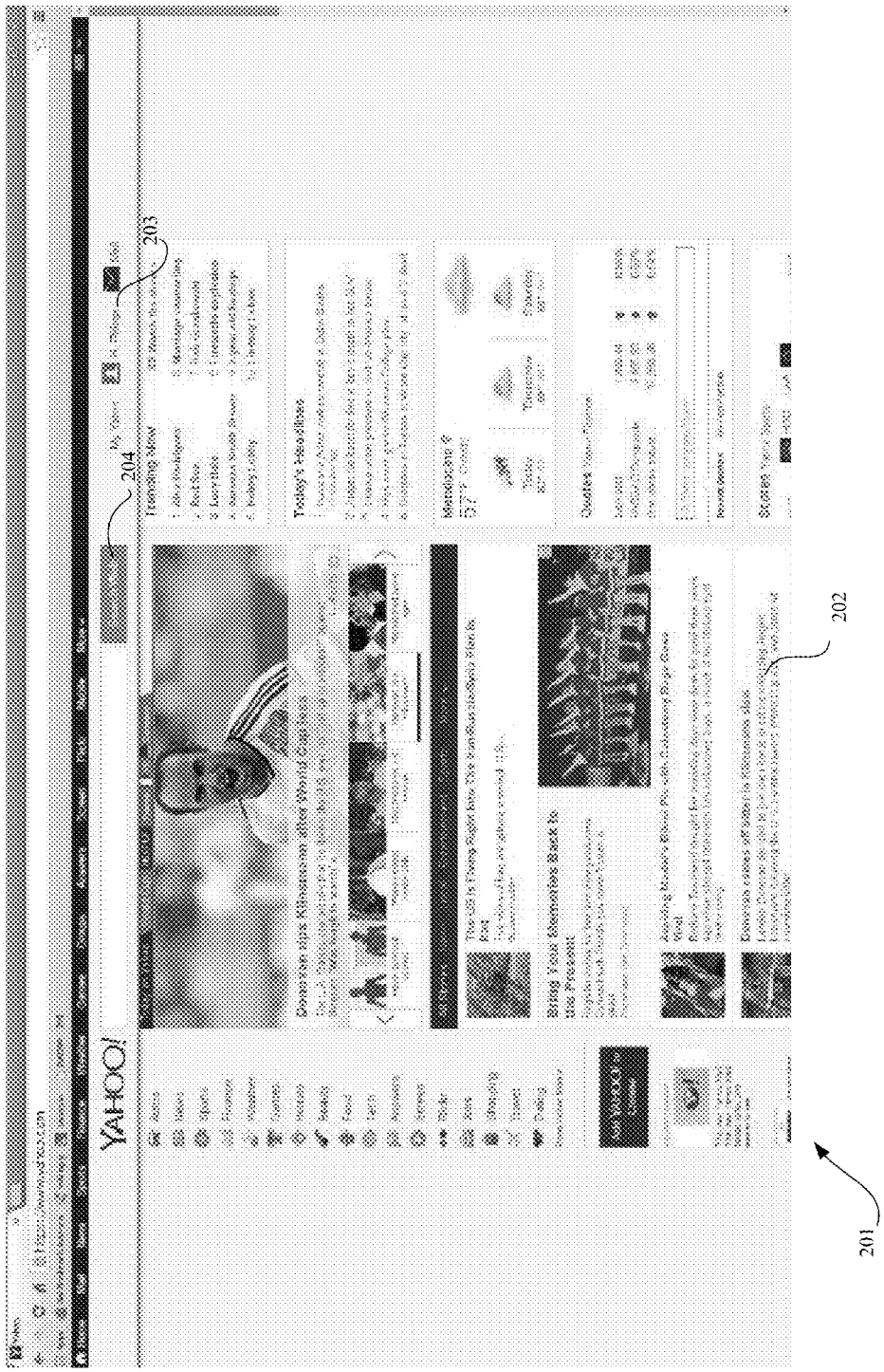
FIG. 2 is a webpage for a news service serving a personalized content stream, in accordance with an example embodiment.

FIG. 2 is a webpage for a news service serving a personalized content stream, in accordance with an example embodiment. Webpage 201 in this figure is a Yahoo! News webpage. Webpage 201 includes a content stream 202 which is a scrollable stream of content items that are ordered based on an interestingness algorithm which is personalized for a user 203 (e.g., as identified through login authentication). In an example embodiment, the personalization might include personalization based at least in part on implicit relevance feedback in the form of a viewing/listening profile or history for user 203. It will be appreciated that webpage 201 also includes an edit box 204 which allows user 203 to enter a query and transmit it to a web-searching service (e.g., by clicking on the button labeled "Search Web"). The search results for such a query might be shown in a search engine results page (SERP), which is not shown.

Figure 3:
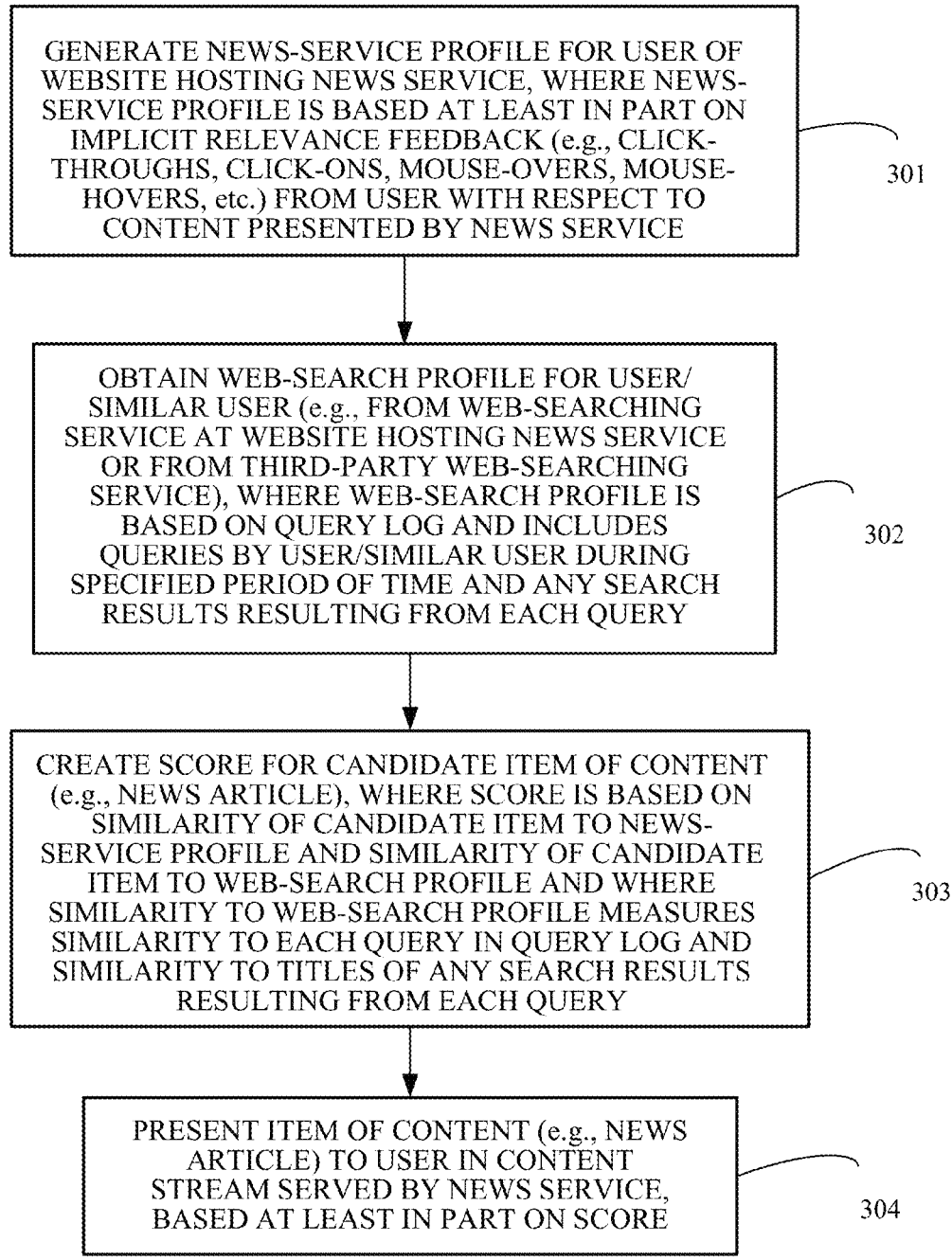
FIG. 3 is a flowchart diagram of a process for using a web-search history to personalize a content stream served by a news service, in accordance with an example embodiment.

FIG. 3 is a flowchart diagram of a process for using a web-search history to personalize a content stream served by a news service, in accordance with an example embodiment. In an example embodiment, the operations shown in this figure might be performed by software for services running on servers at website 104 (e.g., a website such as Yahoo! or Google with multiple services including a news service and a web-searching service) using persistent storage 105. In an alternative example embodiment, some of the operations shown in this figure might be performed by software (e.g., a webpage with embedded JavaScript or ActionScript) running on a client device (e.g., personal computer 102 or mobile device 103).

As depicted in FIG. 3, software at a website hosting a news service generates a news-service profile for a user, in operation 301. In an example embodiment, the news-service profile might be based at least in part on implicit relevance feedback (e.g., click-throughs, click-ons, mouse-overs, mouse-hovers, etc.) from a user with respect to content presented by the news service (e.g., in a content stream). In an example embodiment, the implicit relevance feedback might be supplemented by (a) explicit relevance feedback in the form of explicit preferences received from the user, e.g., through a dialog in a graphical user interface (GUI), (b) collaborative filtering using the profiles of similar users, and/or (c) social signals (e.g., likes, shares, comments, etc.) from social contacts (or friends) in an online social network. In operation 302, the software obtains a web-search profile for the user (and/or a similar user, e.g., as determined by a clustering technique), e.g., from a web-searching service at the website hosting the news service or from a third-party web-searching service. In an example embodiment, this operation might be performed after the user has expressly consented to the operation, e.g., through a GUI dialog. In an example embodiment, the web-search profile might be based on a query log and includes the queries issued by the user (and/or similar user) during a specified period of time (e.g., approximately the previous 3-6 months) and any search results resulting from each of the queries. In operation 303, the software creates a score for a candidate item of content (e.g., a news article). In an example embodiment, the score might be based at least in part on the similarity of the candidate item to the news-service profile and the similarity of the candidate item to the web-search profile. In an example embodiment, the score might be based at least in part on an interestingness algorithm, as well. Also, in an example embodiment, the similarity to the web-search profile might measure both (a) similarity to each of the queries in the query log and (b) similarity to the titles of any search results resulting from each of the queries. Then, in operation 304, the software presents the item of content (e.g., news article) to the user in a content stream served by the news service, based at least in part on the score (e.g., with higher scores towards the top of the content stream and lower scores towards the bottom of the content stream or left out of the content stream).

In operation 302 above, the software obtains a web-search profile for a user (and/or similar user). In an example embodiment, a web-search profile might be based on a query log (e.g., from a search engine) and include: (a) only query terms; (b) query terms plus the titles of the top-ranked search results (e.g., web pages); or (c) query terms plus the titles and abstracts (or snippets) of the top-ranked search results. Also, as explained below, a web-search profile (e.g., (a), (b), or (c)) might be rescaled using an IDF (inverse document frequency) function (e.g., TF-IDF or term frequency-inverse document frequency), in an example embodiment.

Using formal notation, web-search profiles (a), (b) and (c) might be represented as follows, in an example embodiment. Given a topic space T of dimensionality $N_f$, a user profile might be represented as an $N_f$-dimensional numerical vector, where each element i denotes the degree of user interest in the topic i of T. Using a basic bag-of-words model to define the topic space, $N_f$ corresponds to the number of distinct terms (e.g., unigrams or 1-grams) that form a vocabulary for the topic space. $N_u$ corresponds to the total number of selected users. And $N_q$ corresponds to the total number of queries issued to the search engine by all of these users in the selected period.

The terms of the complete set of queries might be represented as an ($N_q \times N_f$)-dimensional integer matrix $Q_w$ where each entry $Q_{wij}$ stores the number of times term j appears in query i. The title terms and the abstract terms of the top-ranked results of each query might be represented in an analogous way by ($N_q \times N_f$)-dimensional matrices $T_w$ and $A_w$ above. And the information about the queries issued by the various users might be stored in a binary matrix $Q_u$ of size $N_q \times N_u$, where $Q_{uij}=1$ if and only if user j issued query i.

Using the above notation, the query-based web-search profiles (identified as (a) above) of the selected set of users might be represented as the rows in an ($N_u \times N_f$)-dimensional matrix $U_q$ defined as $U_q = Q_u^T Q_w$, where T represents the transpose of a matrix. Similarly, the title-enriched web-search profiles (identified as (b) above) of the selected users might be represented as the rows the matrix $U_t = Q_u^T(Q_w + T_w)$, while the rows of the matrix $U_a = Q_u^T(Q_w + T_w + A_w)$ might represent the abstract-enriched search profiles (identified as (c) above) of the selected users.

In order to properly account for term importance, the entries of the three matrices $U_q$, $U_t$, and $U_a$ might be rescaled using an IDF function computed on the corresponding user profiles, in order to alleviate the shortcomings resulting from excessively frequent terms. In an example embodiment, TF-IDF (term frequency-inverse document frequency) might be used as the IDF (inverse document frequency) function. As indicated above, the matrices $U_q$, $U_t$, and $U_a$ contain the search profiles of all the users in the selected set: the profile of a single user i can be obtained by selecting the i-th row of the matrix of interest.

In operation 303 above, the software creates a score for a candidate item of content. In an example embodiment, the score might be based on the similarity of the candidate item to the news-service profile and the similarity of the candidate item to the web-search profile, where similarity is computed using a measure such as the cosine similarity of vectors, the Jaccard similarity of sets, etc. It will be appreciated the cosine similarity of vectors might be used in example embodiments that require relatively faster performance, e.g., in an example embodiment involving the re-ranking of previously presented content items in real-time or near real-time in response to a mouse-over or mouse-hover. In alternative example embodiments, other similarity measures and/or clustering techniques might be used.

In formal terms, every time a user j accesses the news service, the user might be provided with a ranked list of n news articles. Each news article $a_l$ might be assigned a relevance score $se_{jl}$ that expresses how relevant the news article $a_l$ is for user j. Specifically, the score $se_{jl}$ reflects how well a news article $a_l$ matches the news-service profile of user j, e.g., the profile derived from past interaction (or implicit relevance feedback) of the user with the news service. In an example embodiment, this relevance score might be computed by setting it equal to the cosine similarity between the news-service profile vector and the news-article vector. The scores $\{se_{jl}\}$ from l=1 to n determine the ranking positions $\{pe_{jl}\}$ from l=1 to n ($pe_{jl} \in [1 \ldots n]$) associated with the articles in the list, where higher scores correspond to lower ranking positions (e.g., the most similar article will have the highest score and will be ranked 1, which is the lowest rank). To leverage web-search profiles, each news article $a_l$ might be associated with a relevance score $ss_{jl}$, which is computed as the cosine similarity between the web-search profile of user j and news-article $a_l$. The relevance scores $\{ss_{jl}\}$ from l=1 to n, in turn, might yield a ranking $\{ps_{jl}\}$ from l=1 to n ($ps_{jl} \in [1 \ldots n]$), where higher scores again correspond to lower ranking positions (e.g., the most similar news article will have the highest score and will be ranked 1, which is the lowest rank).

In order to combine relevance scores and/or ranking positions given by web-search profiles with relevance scores and/or ranking positions given by news-service profiles, the software might use: (a) score aggregation (denoted "SP Score", where "SP" stands for "search profiles") and/or (b) rank aggregation (denoted "SP Rank"). In an example embodiment, SP Score might be computed by combining the two relevance scores (e.g., $se_{jl}$ and $ss_{jl}$) and using the combined score to determine a final ranking, whereas SP Rank might be computed by combining the two rankings (e.g., $N_{jl}$ and $ps_{jl}$) to determine a final ranking More specifically, the combined score $S_{sjl}$ provided by SP Score might be computed as a linear combination of the min-max-normalized $se_{jl}$ and $ss_{jl}$ scores (with normalization performed to project the two scores onto a common [0, 1] range). And this combined score $S_{sjl}$ might be used to determine a final ranking By contrast, the final ranking produced by SP Rank might be computed by applying the well-known Borda-count election method to the two rankings, e.g., $\{pejl\}$ from l=1 to n and $\{psjl\}$ from l=1 to n.

In other example embodiments, other techniques might be used to combine relevance scores and/or ranking positions given by web-search profiles with relevance scores and/or ranking positions given by news-service profiles. For example, relevance scores for web-search profiles and relevance scores for news-service profiles might be combined using multivariate regression, where the relevance scores for web-search profiles are one independent variable and the relevance scores for news-service profiles are another independent variable. In an example embodiment, relevance scores (or ranking positions) for web-search profiles and relevance scores (or ranking positions) given for news-service profiles might be combined using machine-learning techniques (e.g., supervised learning, unsupervised learning, or online active learning.)

Figure 4:
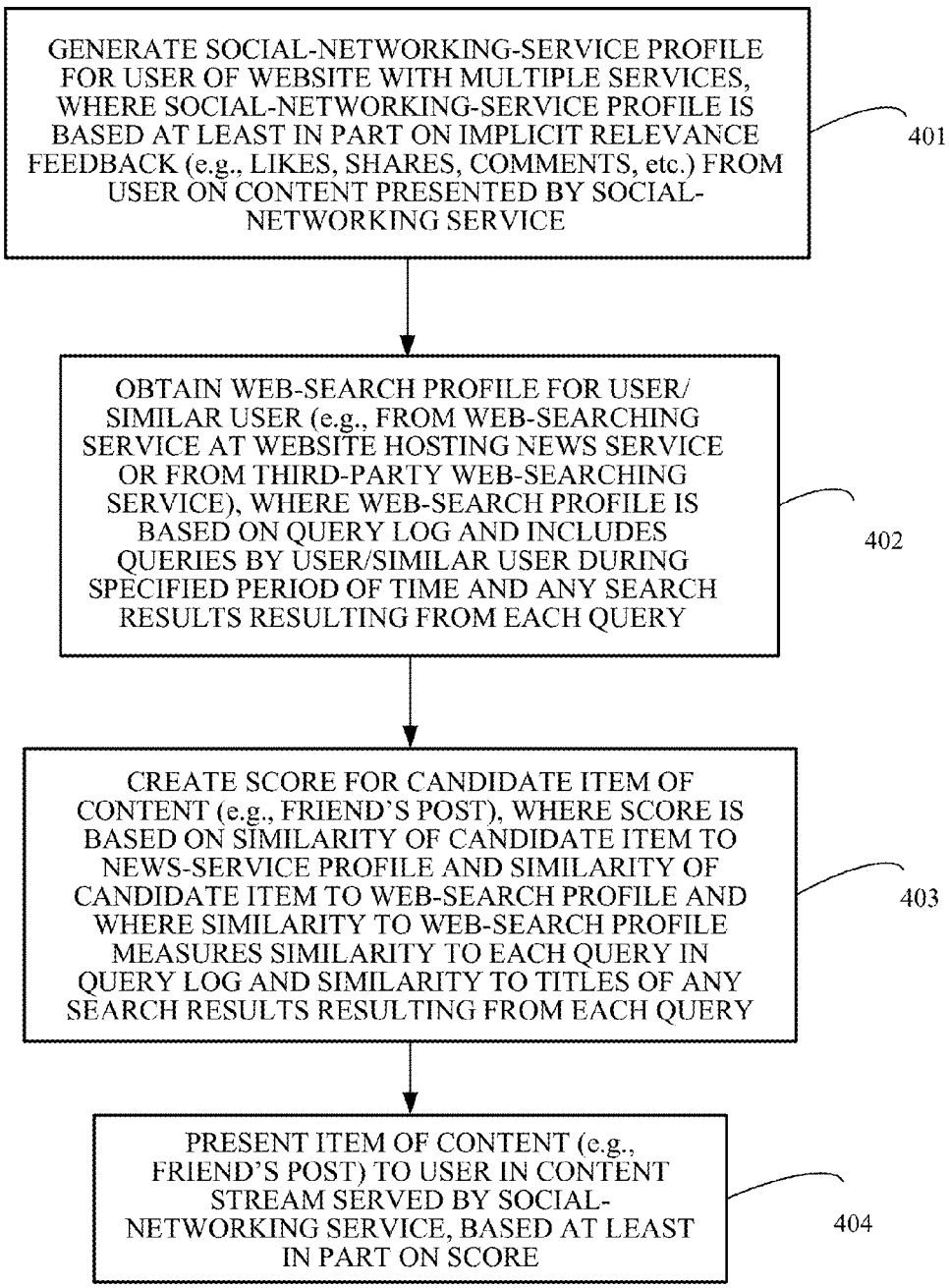
FIG. 4 is a flowchart diagram of a process for using a web-search history to personalize a content stream served by a social-networking service, in accordance with an example embodiment.
Figure 5:
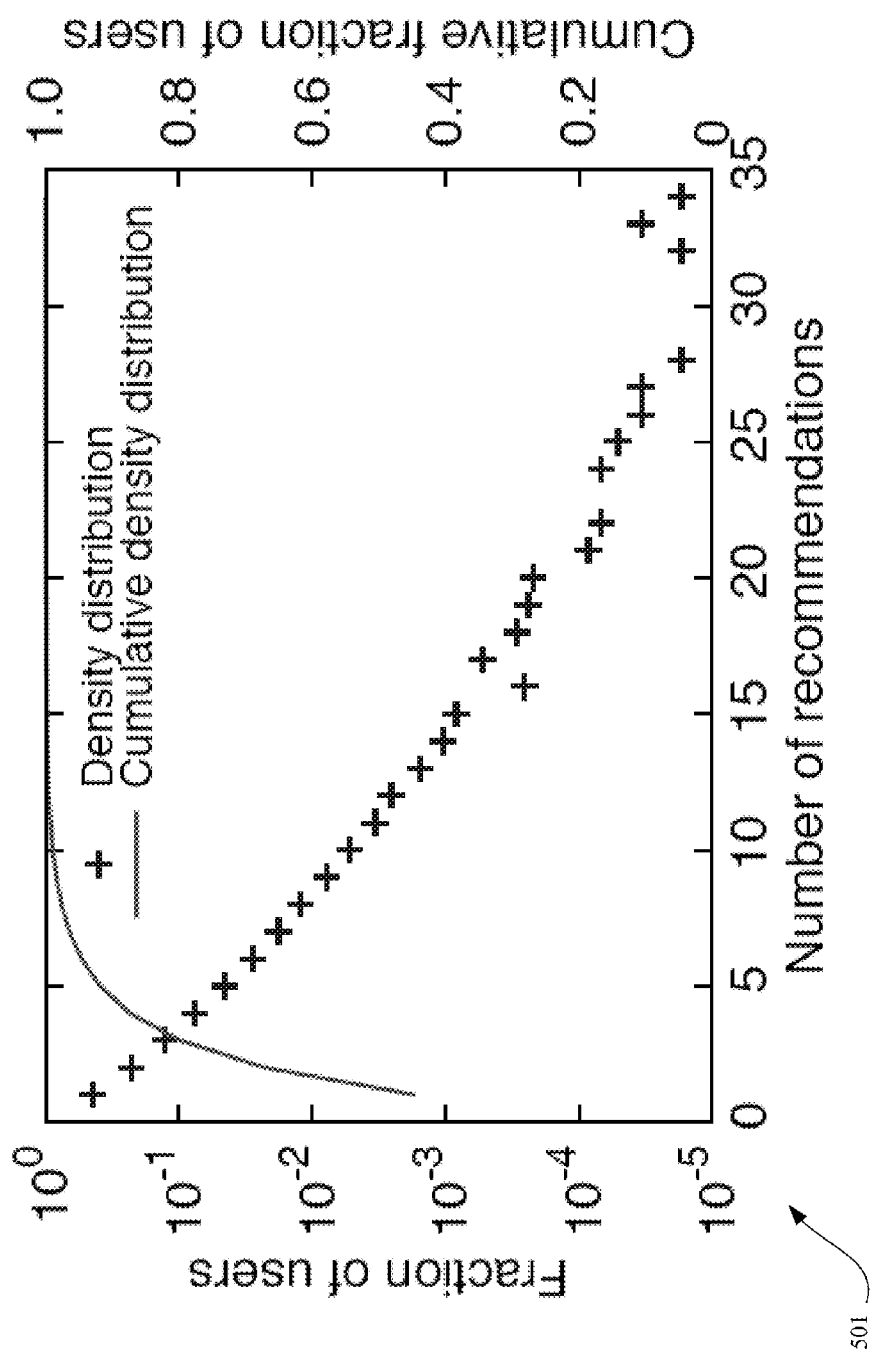
FIG. 5 is a plot showing a distribution of recommendations served to users of a website hosting multiple services including a news service.

FIG. 4 is a flowchart diagram of a process for using a web-search history to personalize a content stream served by a social-networking service, in accordance with an example embodiment. In an example embodiment, the operations shown in this figure might be performed by software for services running on servers at website 110 (e.g., a website with multiple services including a social-networking service and a web-searching service like Facebook, Google+, etc.) using persistent storage 111. In an alternative example embodiment, some of the operations shown in this figure might be performed by software (e.g., a webpage with embedded JavaScript or ActionScript) running on a client device (e.g., personal computer 102 or mobile device 103).

As depicted in FIG. 4, software at a website hosting a social-networking service generates a social-networking-service profile for a user, in operation 401. In an example embodiment, the news-service profile might be based at least in part on implicit relevance feedback (e.g., likes, shares, comments, etc.) from a user with respect to content presented by the social-networking service (e.g., in a content stream). In an example embodiment, the implicit relevance feedback might be supplemented by (a) explicit relevance feedback in the form of explicit preferences received from the user, e.g., through a GUI dialog, (b) collaborative filtering using the profiles of similar users, and/or (c) social signals (e.g., likes, shares, comments, etc.) from social contacts (or friends) in an online social network. In operation 402, the software obtains a web-search profile for the user (and/or a similar user, e.g., as determined by a clustering technique), e.g., from a web-searching service at the website hosting the social-networking service or from a third-party web-searching service. In an example embodiment, this operation might be performed after the user has expressly consented to the operation, e.g., through a GUI dialog. In an example embodiment, the web-search profile might be based on a query log and include the queries issued by the user (and/or similar user) during a specified period of time (e.g., approximately the previous 3-6 months) and any search results resulting from each of the queries. In operation 403, the software creates a score for a candidate item of content (e.g., a friend's post). In an example embodiment, the score might be based at least in part on the similarity of the candidate item to the social-networking-service profile and the similarity of the candidate item to the web-search profile. In an example embodiment, the score might be based at least in part on an interestingness algorithm, as well. Also, in an example embodiment, the similarity to the web-search profile might measure both (a) similarity to each of the queries in the query log and (b) similarity to the titles of any search results resulting from each of the queries. Then, in operation 404, the software presents the item of content (e.g., a friend's post) to a user in the content stream served by the social-networking service, based at least in part on the score (e.g., with higher scores towards the top of the content stream and lower scores towards the bottom of the content stream or left out of the content stream).

In operation 402 above, the software obtains a web-search profile for a user (and/or similar user). In an example embodiment, a web-search profile might be based on a query log (e.g., from a search engine) and contain: (a) only query terms; (b) query terms plus the titles of the top-ranked search results (e.g., web pages); or (c) query terms plus the titles and abstracts (or snippets) of the top-ranked search results. Also, as explained above, a web-search profile (e.g., (a), (b), or (c)) might be rescaled using an IDF (inverse document frequency) function (e.g., TF-IDF), in an example embodiment.

In operation 403 above, the software creates a score for a candidate item of content. In an example embodiment, the score might be based on the similarity of the candidate item to the social-networking-service profile and the similarity of the candidate item to the web-search profile, where similarity is computed using a measure such as the cosine similarity of vectors, the Jaccard similarity of sets, etc. It will be appreciated the cosine similarity of vectors might be used in example embodiments that require relatively faster performance, e.g., in an example embodiment involving the re-ranking of previously presented content items in real-time or near real-time in response to a mouse-over or mouse-hover. In alternative example embodiments, other similarity measures and/or clustering techniques might be used.

In order to combine relevance scores and/or ranking positions given by web-search profiles with relevance scores and/or ranking positions given by social-networking-service profiles, the software might use: (a) score aggregation (e.g., "SP Score") and/or (b) rank aggregation (e.g., "SP Rank"). In other example embodiments, other techniques might be used to combine relevance scores and/or ranking positions given by web-search profiles with relevance scores and/or ranking positions given by social-networking-services. For example, relevance scores for web-search profiles and relevance scores for social-networking-services might be combined using multivariate regression, where the relevance scores for web-search profiles are one independent variable and the relevance scores for social-networking-services are another independent variable. In an example embodiment, relevance scores (or ranking positions) for web-search profiles and relevance scores (or ranking positions) given for social-networking-services might be combined using machine-learning techniques (e.g., supervised learning, unsupervised learning, or online active learning.)

It will be appreciated that operation 301 in FIG. 3 describes the use of a news-service profile generated by a news service and operation 401 in FIG. 4 describes the use of social-networking-service profile generated by a social-networking service. These example embodiments are not meant to be limiting. In an example embodiment, the service might be a retail service, a video service, a music service, etc. Similarly, the web-search profile in operation 302 and operation 402 might be replaced/supplemented by a social-networking-service profile, a buyer profile, a viewer profile, a listener profile, etc., in alternative example embodiments.

The process shown in FIG. 3 was tested using historical click data (or logs) and query data (or logs) from a website hosting a news service and a web-searching service. It will be appreciated that the tests themselves are example embodiments for purposes of disclosure. So for example, plot 701 shows the results for the combinations SP Score and SP Rank for tests that were based on web-search profiles using queries and titles (e.g., $U_t$), where the queries were issued by the user during a three-month time period prior to test day. A corresponding example embodiment might include the combination SP Score and web-search profiles using queries and titles (e.g., $U_t$), where the queries were issued by the user during a three-month time period prior to the present day. For the tests, users of the website were chosen for the testing if they clicked on at least one news article on the test day and issued at least 1000 queries during the three months prior to the test day. Plot 501 shows a distribution of the approximately 140K independent news-article recommendations served to these users, who numbered approximately 70K.

Figure 6:
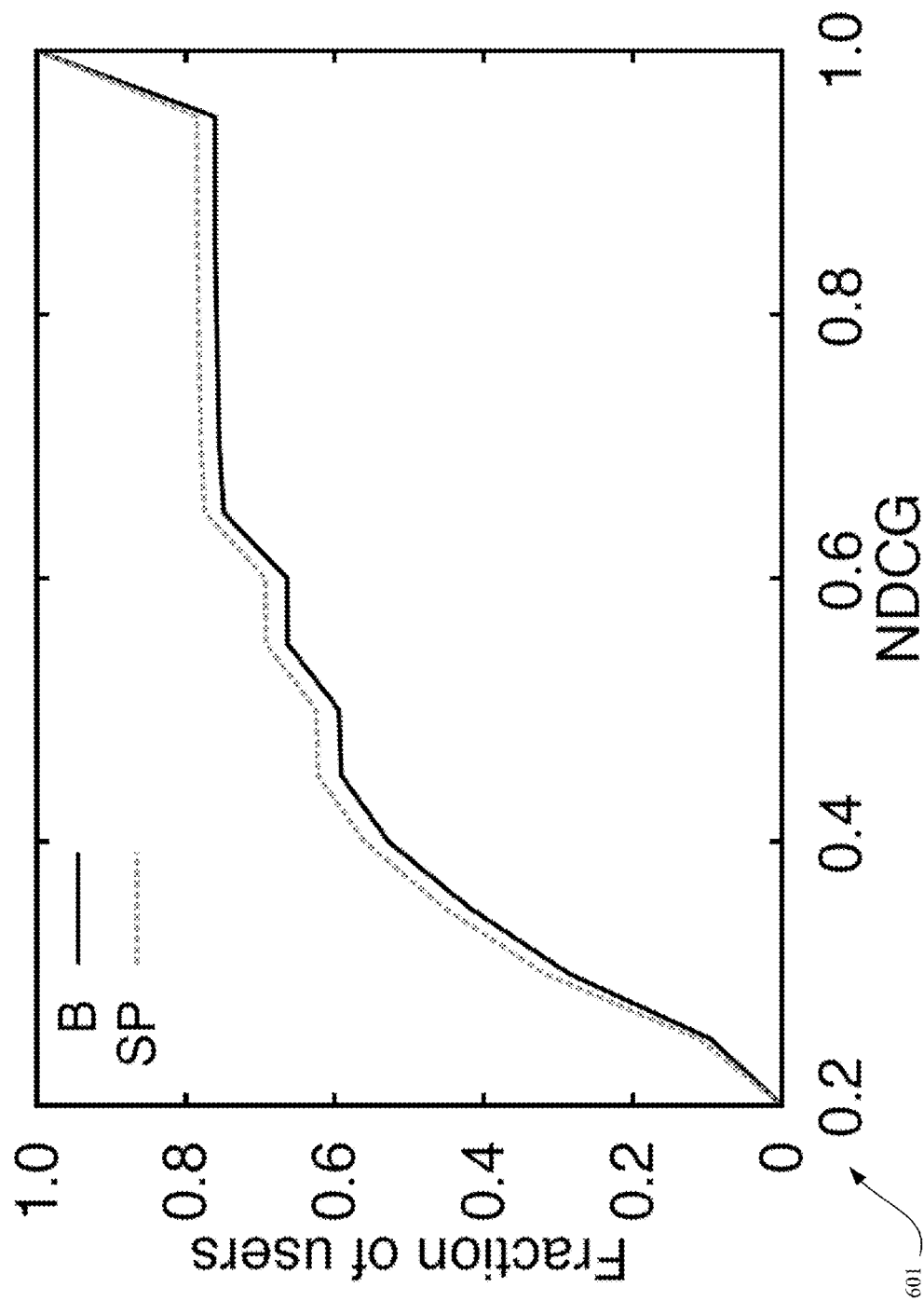
FIG. 6 is a plot showing the relative performance of news personalization based on web-search profiles.

Plot 601 in FIG. 6 is a plot showing the relative performance of news personalization based on web-search profiles. In plot 601, performance is measured using a variant of a metric known as Normalized Discounted Cumulative Gain (NDCG), which in turn, uses a variant of a metric known as Discounted Cumulative Gain (DCG). The formula for DCG is shown below:

$$DCG(\rho) = rel(\rho(1)) + \sum_{i=2}^{20} \frac{rel(\rho(i))}{\log_2(i+1)}$$

As used in this formula, p is ranking of the 20 news articles in a pageview p presented to a particular user. The ranking p is based on a profile for the user, e.g.: (a) a news-service profile (denominated B or B for baseline profile); (b) a news-service profile and a web-search profile (e.g., $U_q$, $U_t$, or $U_a$) combined using SP Score, or (c) a news-service profile and a web-search profile (e.g., $U_q$, $U_t$, or $U_a$) combined using SP Rank. The relevance of a news article a on pageview p is measured using rel(a), which is a function whose value is 1 if the user clicked on news article a and whose value is 0 otherwise.

The formula for NDCG is as follows:

$$NDCG(\rho) = \frac{DCG(\rho)}{DCG(\rho^*)}$$

As used in this formula, $\rho^*$ is an ideal ranking of the news articles on the pageview p, such that all news articles having rel(a) equal to 1 are at the top of the ranking and all articles equal to 0 are at the bottom of the ranking.

In plot 601 in FIG. 6, the web-search profile (SP) used to rank the news articles is based on queries and titles (e.g., $U_t$), where the queries were issued by the user during a three-month time period prior to test day. Here, the rankings based on the news-service profile (B) outperformed the rankings based on the web-search profiles with an average NDCG for B equal to 0.522 and an average NDCG for SP (not SP Score or SP Rank) equal to 0.501.

The plot 601 reflects these average NDCG values. So at approximately 0.6 NDCG on the x-axis, the fraction of users on the y-axis is approximately 0.65 for rankings based on B and approximately 0.70 for rankings based on SP. That is to say, approximately 35% of the users have an NDCG greater than 0.6 for rankings based on B and approximately 30% of users have an NDCG greater than 0.6 for rankings based on SP. It will be appreciated that the plots in FIGS. 7, 8A, 8B, 10A, 10B, 10C, 12A, 12B, 13A, and 13B should be understood in a similar way.

Figure 7:
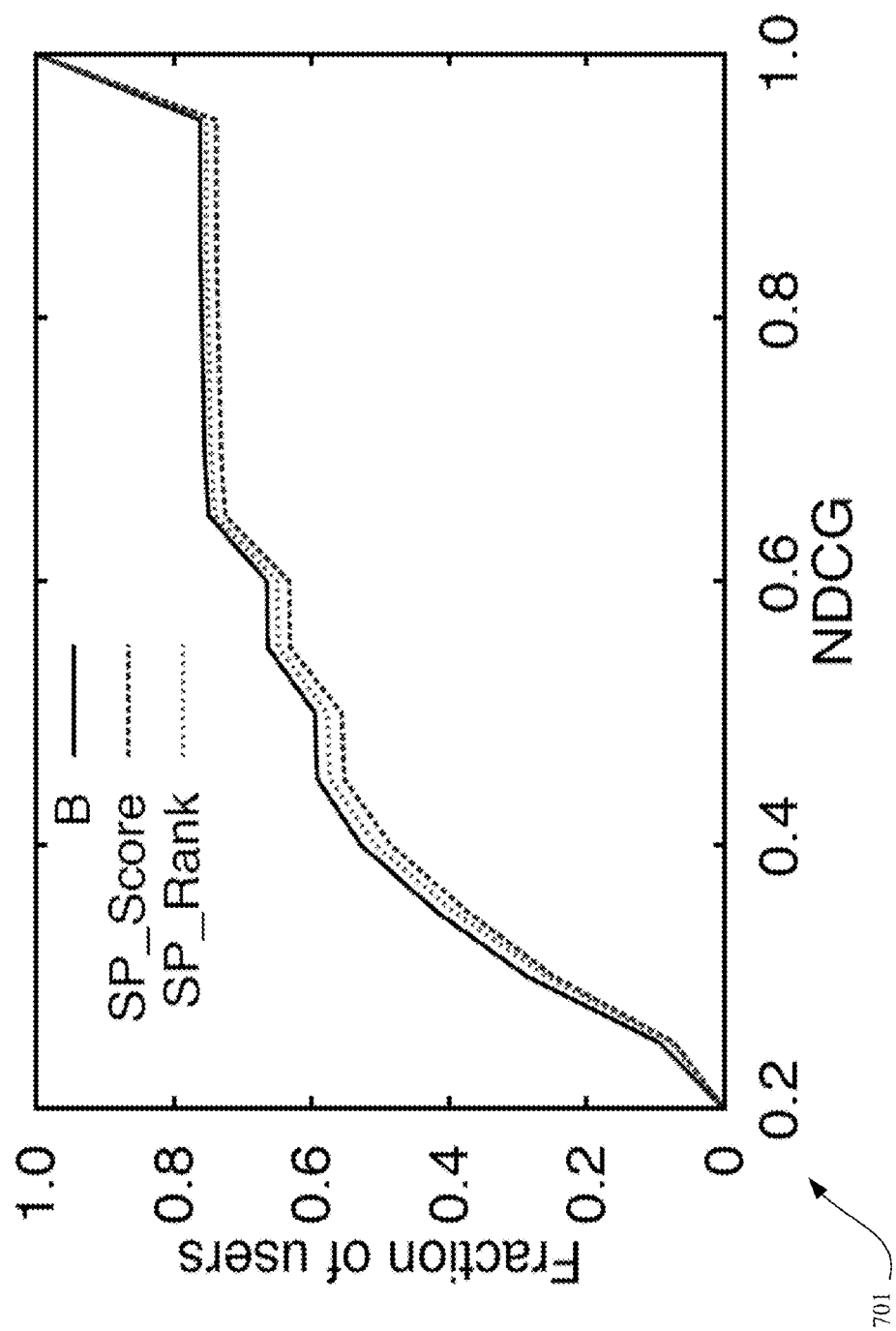
FIG. 7 is a plot showing the relative performance of news personalization based on web-search profiles plus news-service profiles.

Plot 701 in FIG. 7 is a plot showing the relative performance of news personalization based on web-search profiles plus news-service profiles. In plot 701, the combinations SP Score and SP Rank were based on web-search profiles using queries and titles (e.g., $U_t$), where the queries were issued by the user during a three-month time period prior to test day. Here, the rankings based on both the SP Score combination and the SP Rank combination outperformed the news-service combination (B) with an average NDCG for B equal to 0.522, an average NDCG for SP Score equal to 0.545, and an average NDCG for SP Rank equal to 0.533. The difference between the average NDCG for B and the average NDCG for SP Score was statistically significant (e.g., p-value less than 0.05), as was the difference between the average NDCG for B and the average NDCG for SP Rank.

Figure 8A:
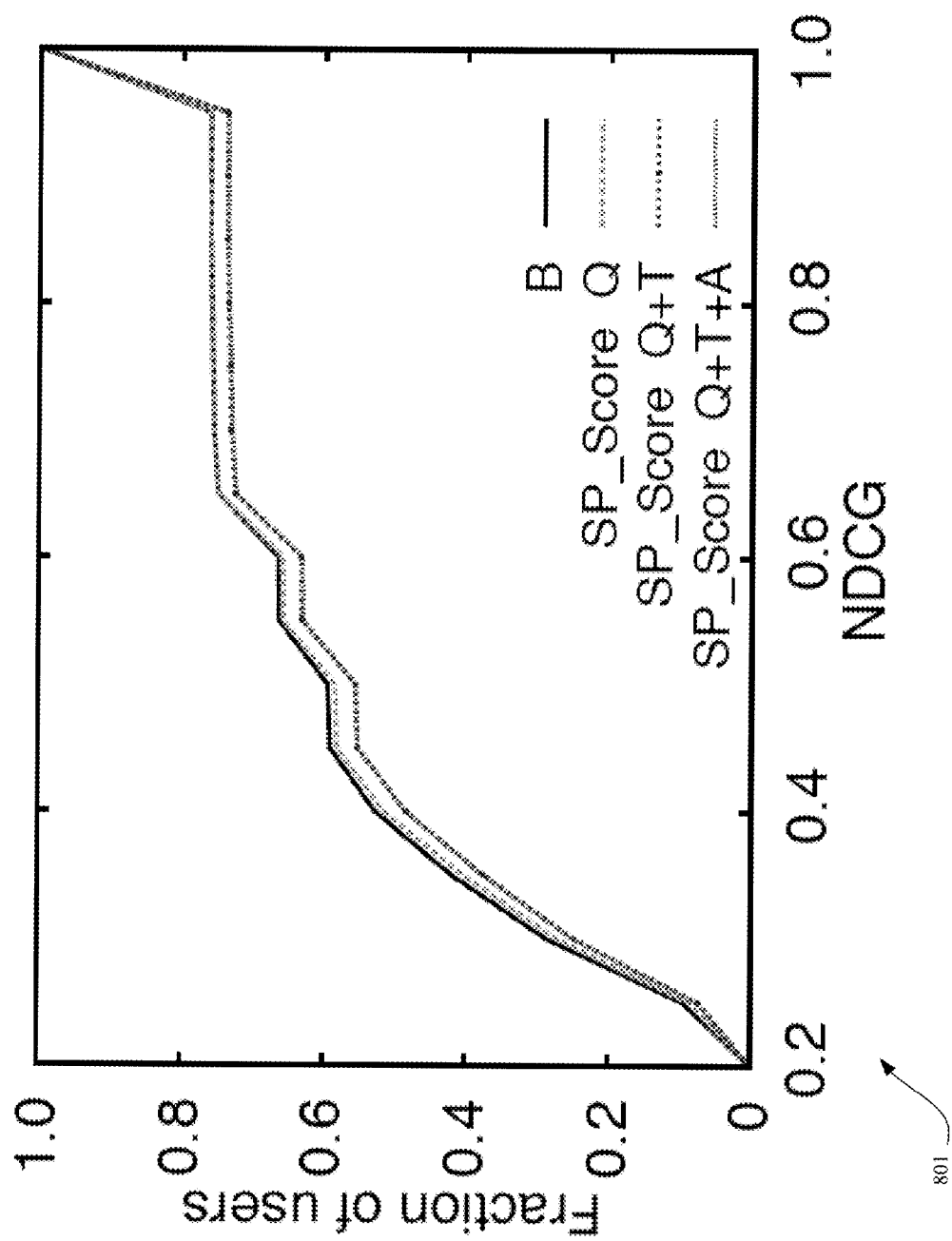
FIG. 8A is a plot showing the relative performance of news personalization based on web-search profiles plus news-service profiles combined using score aggregation.

Plot 801 in FIG. 8A is another plot showing the relative performance of news personalization based on web-search profiles plus news-service profiles combined using score aggregation (SP Score), in accordance with an example embodiment. Here, each of the rankings for the SP Score combination outperformed the news-service profiles (B) with an average NDCG for B equal to 0.522, an average NDCG for SP Score using queries only ($U_q$) equal to 0.526, an average NDCG for SP Score using queries and titles ($U_t$) equal to 0.545, and an average NDCG for SP Score using queries, titles, and abstracts ($U_a$) equal to 0.545. The difference between the average NDCG for B and the average NDCG for SP Score using queries and titles ($U_t$) was statistically significant (e.g., p-value less than 0.05), as was the difference between the average NDCG for B and the average NDCG for SP Score using queries, titles, and abstracts ($U_a$). It will also be appreciated that the average NDCG for SP Score using queries and titles ($U_t$) equaled the average NDCG for SP Score using queries, titles, and abstracts ($U_a$), despite the additional computation used to include the abstracts.

Figure 8B:
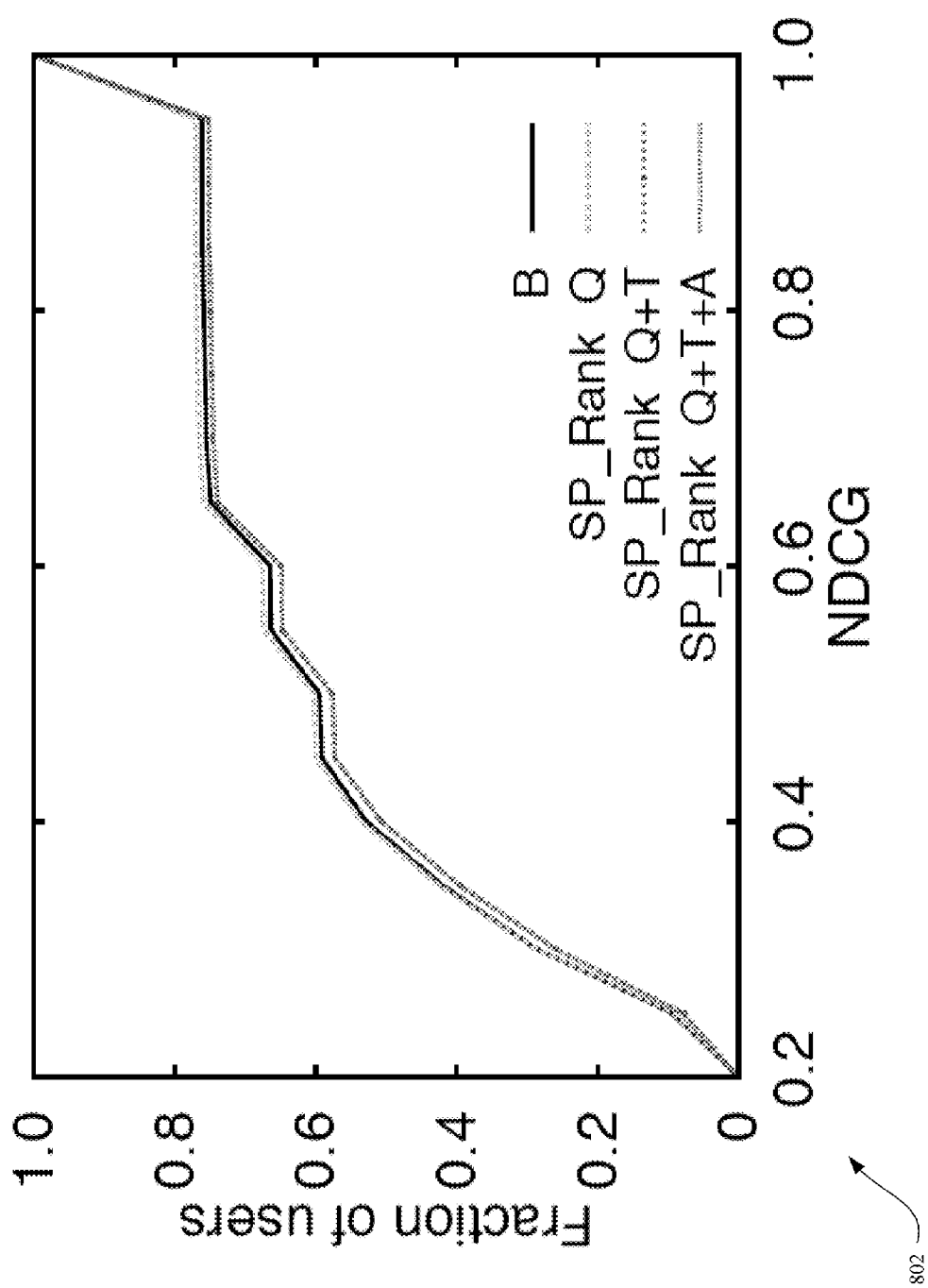
FIG. 8B is a plot showing the relative performance of news personalization based on web-search profiles plus news-service profiles combined using rank aggregation.

Plot 802 in FIG. 8B is a plot showing the relative performance of news personalization based on web-search profiles plus news-service profiles combined using rank aggregation (SP Rank). Here, most of the rankings for the SP Rank combination outperformed the news-service profiles (B) with an average NDCG for B equal to 0.522, an average NDCG for SP Rank using queries only ($U_g$) equal to 0.516, an average NDCG for SP Rank using queries and titles ($U_t$) equal to 0.533, and an average NDCG for SP Rank using queries, titles, and abstracts ($U_a$) equal to 0.533. The difference between the average NDCG for B and the average NDCG for SP Rank using queries and titles ($U_t$) was statistically significant (e.g., p-value less than 0.05), as was the difference between the average NDCG for B and the average NDCG for SP Rank using queries, titles, and abstracts ($U_a$). It will also be appreciated that the average NDCG for SP Rank using queries and titles ($U_t$) equaled the average NDCG for SP Rank using queries, titles, and abstracts ($U_a$), despite the additional computation used to include the abstracts.

Figure 9:
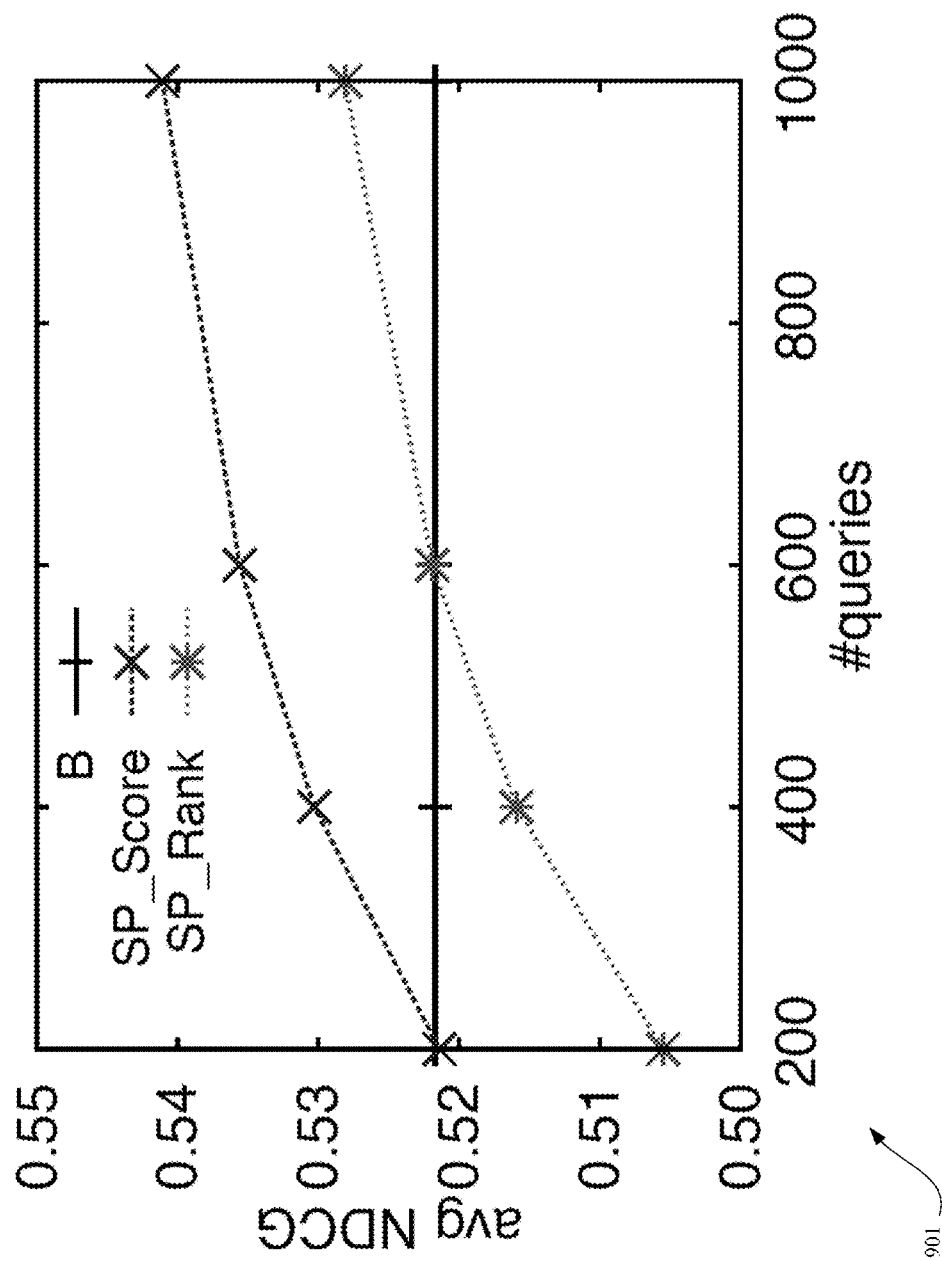
FIG. 9 is a plot showing the relative performance of news personalization based on web-search profiles plus news-service profiles plotted against number of queries.

Plot 901 in FIG. 9 shows the performance of news personalization based on web-search profiles plus news-service profiles plotted against number of queries, where the queries were issued by the user during a three-month time period prior to test day. As shown in this plot, average NDCG increases with the number of queries for both the SP Score combination (using queries and titles ($U_t$)) and the SP Rank combination (using queries and titles ($U_t$)).

Figure 10A:
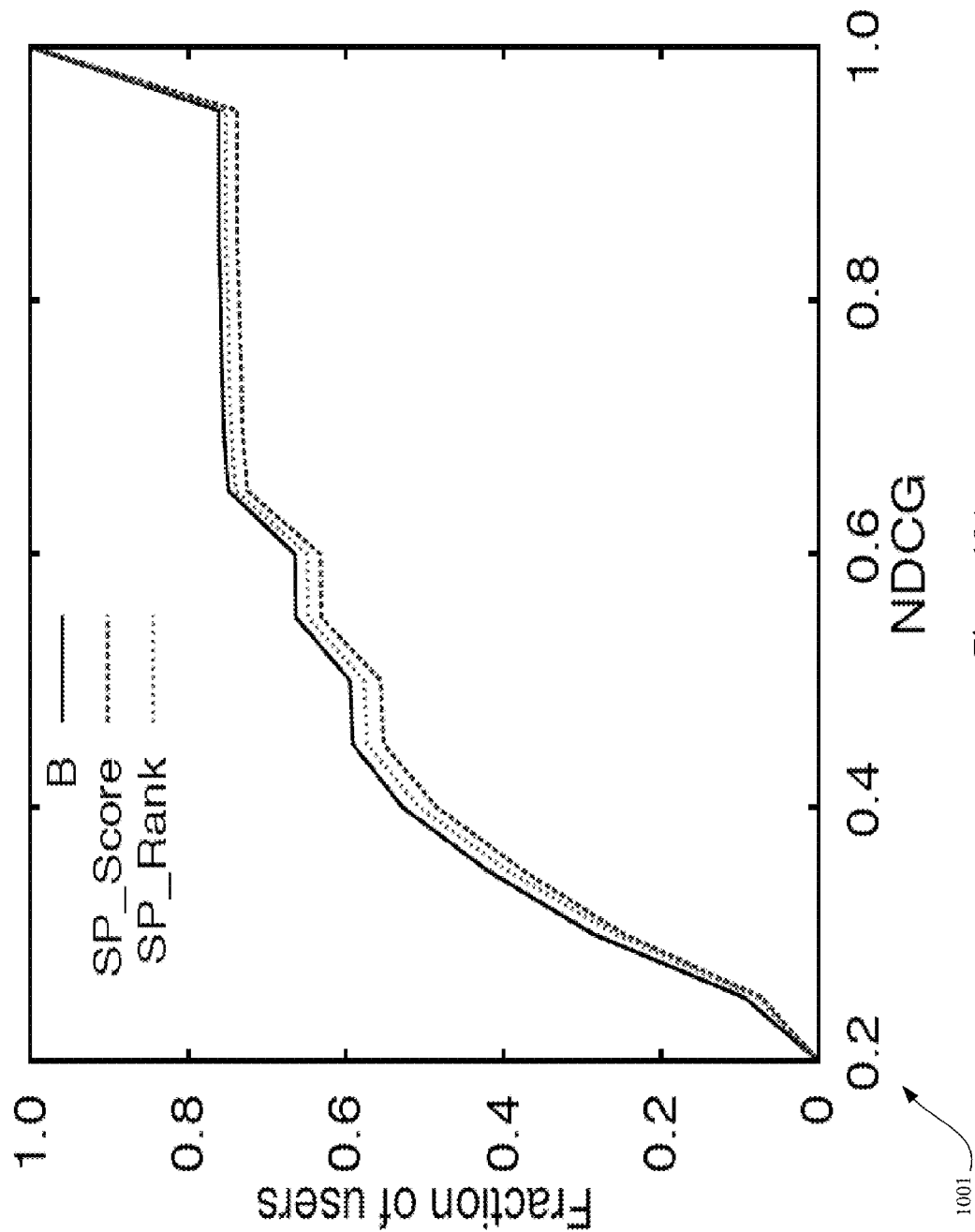
FIG. 10A is a plot showing the relative performance of news personalization based on web-search profiles plus news-service profiles for all users of a news service.

Plot 1001 in FIG. 10A is a plot showing the relative performance of news personalization based on web-search profiles plus news-service profiles for all users of a news service. The SP Score combinations and SP Rank combinations in this plot were based on a web-search profile using queries and titles (e.g., $U_t$), where the queries were issued by the user during a three-month time period prior to test day. Here, the rankings based on both the SP Score combination and the SP Rank combination outperformed the news-service combination (B) with an average NDCG for B equal to 0.522, an average NDCG for SP Score equal to 0.545, and an average NDCG for SP Rank equal to 0.533. The difference between the average NDCG for B and the average NDCG for SP Score was statistically significant (e.g., p-value less than 0.05), as was the difference between the average NDCG for B and the average NDCG for SP Rank.

Figure 10B:
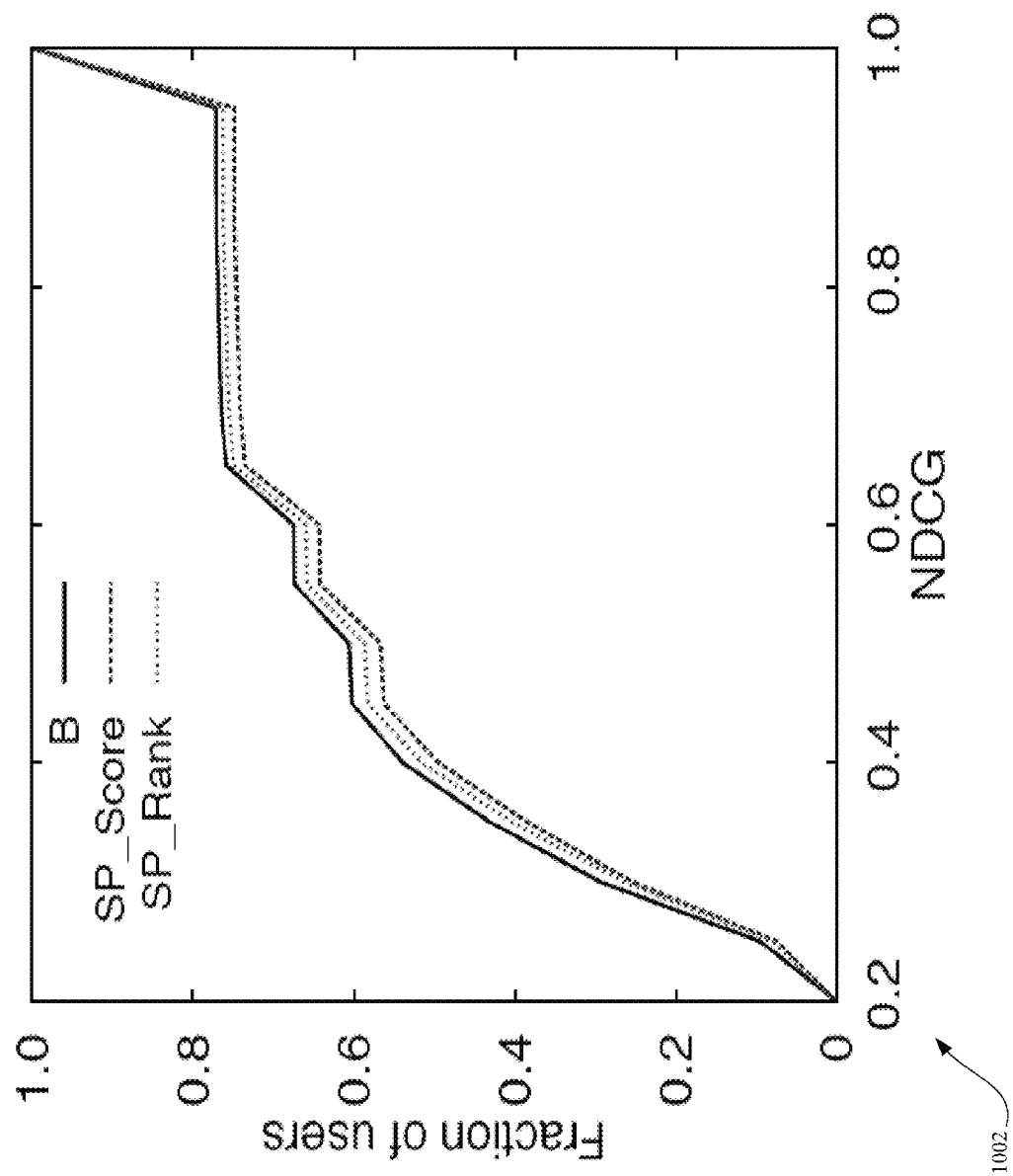
FIG. 10B is a plot showing the relative performance of news personalization based on web-search profiles plus news-service profiles for active users of a news service.

Plot 1002 in FIG. 10B is a plot showing the relative performance of news personalization based on web-search profiles plus news-service profiles for active users of a news service. Here, active users might be defined as users who clicked on at least 100 news articles during a three-month time period prior to test day. The SP Score combinations and SP Rank combinations in this plot were based on a web-search profile using queries and titles (e.g., $U_t$), where the queries were issued by the user during a three-month time period prior to test day. Here, the rankings based on both the SP Score combination and the SP Rank combination outperformed the news-service combination (B) with an average NDCG for B equal to 0.522, an average NDCG for SP Score equal to 0.588, and an average NDCG for SP Rank equal to 0.573. The difference between the average NDCG for B and the average NDCG for SP Score was statistically significant (e.g., p-value less than 0.05), as was the difference between the average NDCG for B and the average NDCG for SP Rank.

Figure 10C:
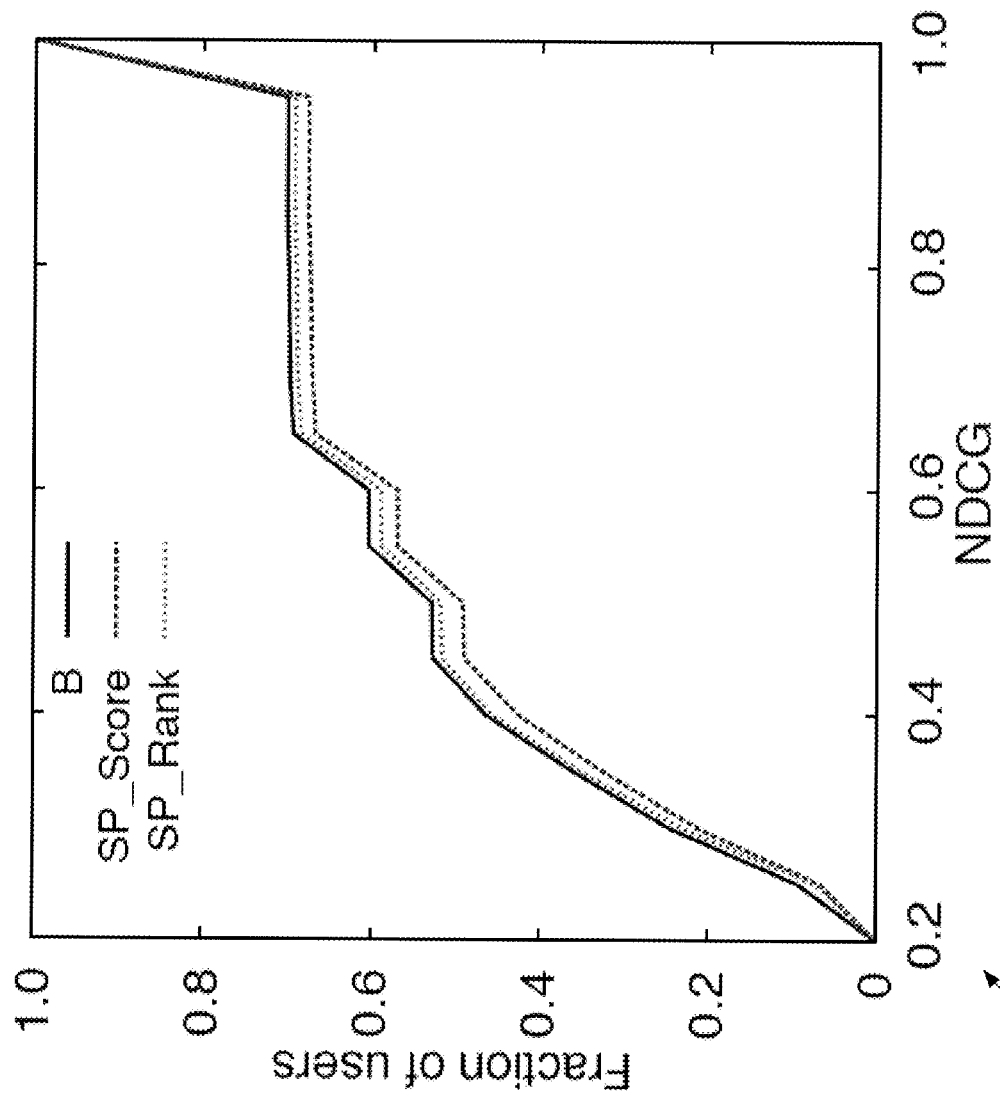
FIG. 10C is a plot showing the relative performance of news personalization based on web-search profiles plus news-service profiles for non-active users of a news service.

Plot 1003 in FIG. 10C is a plot showing the relative performance of news personalization based on web-search profiles plus news-service profiles for non-active users of a news service, in accordance with an example embodiment. Here, non-active users might be defined as users who did not click on at least 100 news articles during a three-month time period prior to test day. The SP Score combinations and SP Rank combinations in this plot were based on a web-search profile using queries and titles (e.g., $U_t$), where the queries were issued by the user during a three-month time period prior to test day. Here, the rankings based on both the SP Score combination and the SP Rank combination outperformed the news-service combination (B) with an average NDCG for B equal to 0.522, an average NDCG for SP Score equal to 0.538, and an average NDCG for SP Rank equal to 0.526. The difference between the average NDCG for B and the average NDCG for SP Score was statistically significant (e.g., p-value less than 0.05), as was the difference between the average NDCG for B and the average NDCG for SP Rank.

Figure 11:
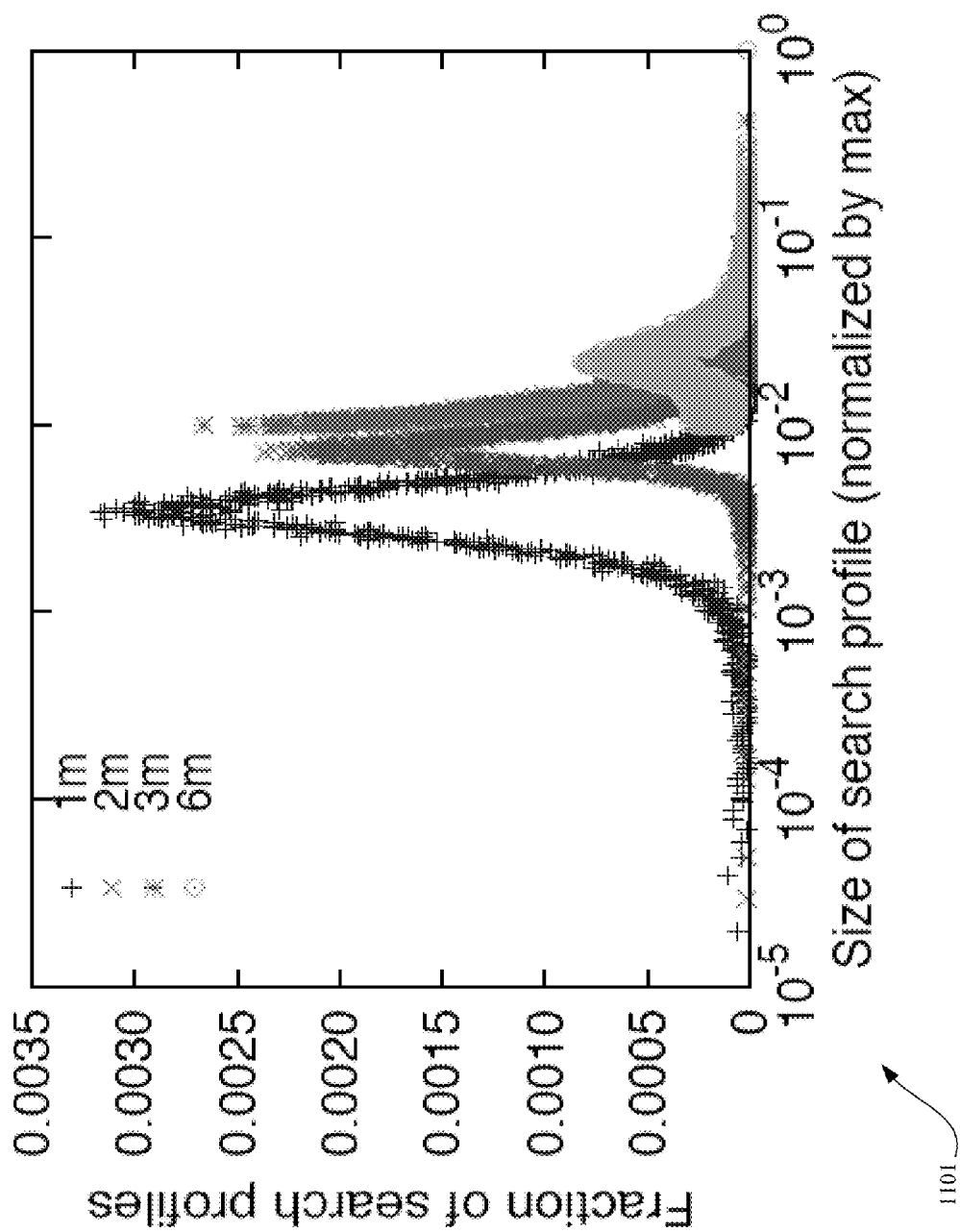
FIG. 11 is a plot showing a distribution of sizes for web-search profiles.

Plot 1101 in FIG. 11 shows a distribution of sizes for web-search profiles for various time periods prior to the test date. The time periods are 1 month, 2 months, 3 months, and 6 months. Size was measured in number of queries issued by user, divided by the maximum number of queries among all users.

Figure 12A:
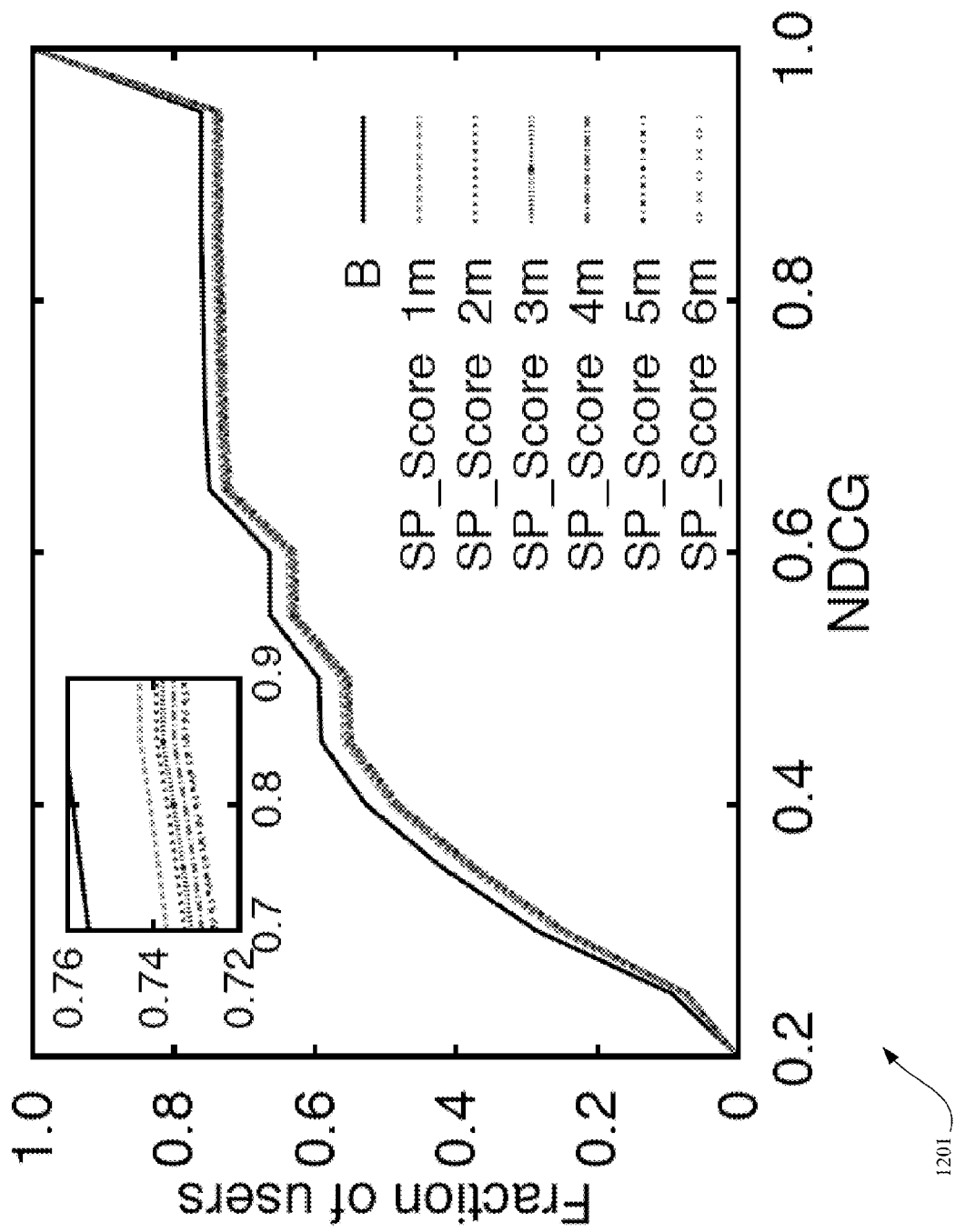
FIG. 12A is a plot showing the relative performance of news personalization using score aggregation plotted against training period used to build web-search profiles.

Plot 1201 in FIG. 12A shows the performance of news personalization using score aggregation (SP Score) with a web-search profile based on queries and titles (e.g., U) plotted against the training period used to build web-search profiles, e.g., the period of time prior to the test date during which a user issues queries. Here, each of the rankings for the SP Score combination outperformed the news-service profiles (B) with an average NDCG for B equal to 0.522, an average NDCG for SP Score using a one-month training period equal to 0.54, an average NDCG for SP Score using a two-month training period equal to 0.543, an average NDCG for SP Score using a three-month training period equal to 0.545, an average NDCG for SP Score using a four-month training period equal to 0.546, an average NDCG for SP Score using a five-month training period equal to 0.548, and an average NDCG for SP Score using a six-month training period equal to 0.549. The difference between the average NDCG for B and each average NDCG for SP Score was statistically significant (e.g., p-value less than 0.05).

Figure 12B:
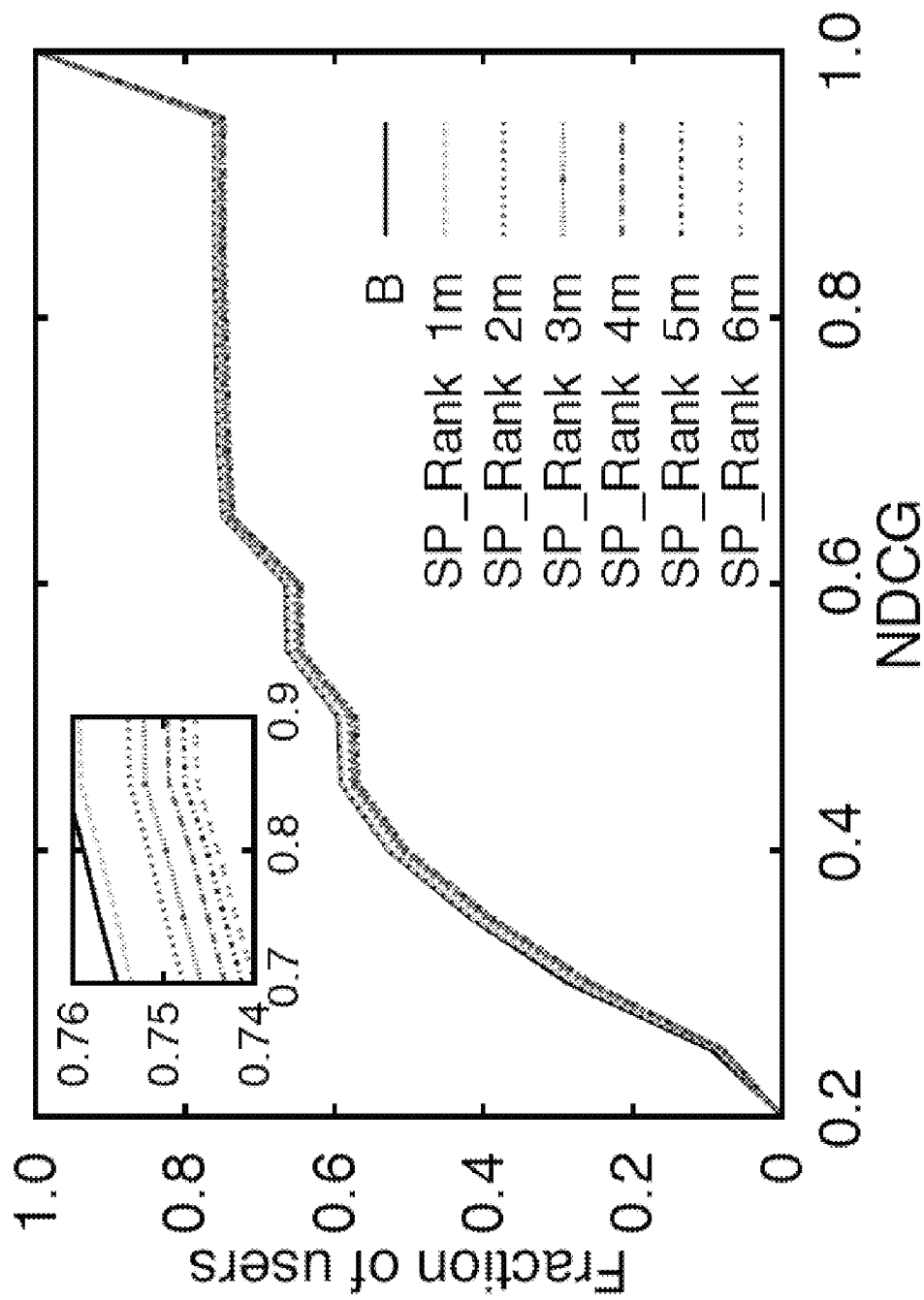
FIG. 12B is a plot showing the relative performance of news personalization using rank aggregation plotted against training period used to build web-search profiles.

Plot 1202 in FIG. 12B shows the performance of news personalization using rank aggregation (SP Rank) with a web-search profile based on queries and titles (e.g., $U_t$) plotted against training period. Here, each of the rankings for the SP Rank combination outperformed the news-service profiles (B) with an average NDCG for B equal to 0.522, an average NDCG for SP Rank using a one-month training period equal to 0.524, an average NDCG for SP Rank using a two-month training period equal to 0.53, an average NDCG for SP Rank using a three-month training period equal to 0.533, an average NDCG for SP Rank using a four-month training period equal to 0.534, an average NDCG for SP Rank using a five-month training period equal to 0.536, and an average NDCG for SP Rank using a six-month training period equal to 0.537. The difference between the average NDCG for B and each average NDCG for SP Rank was statistically significant (e.g., p-value less than 0.05).

Figure 13A:
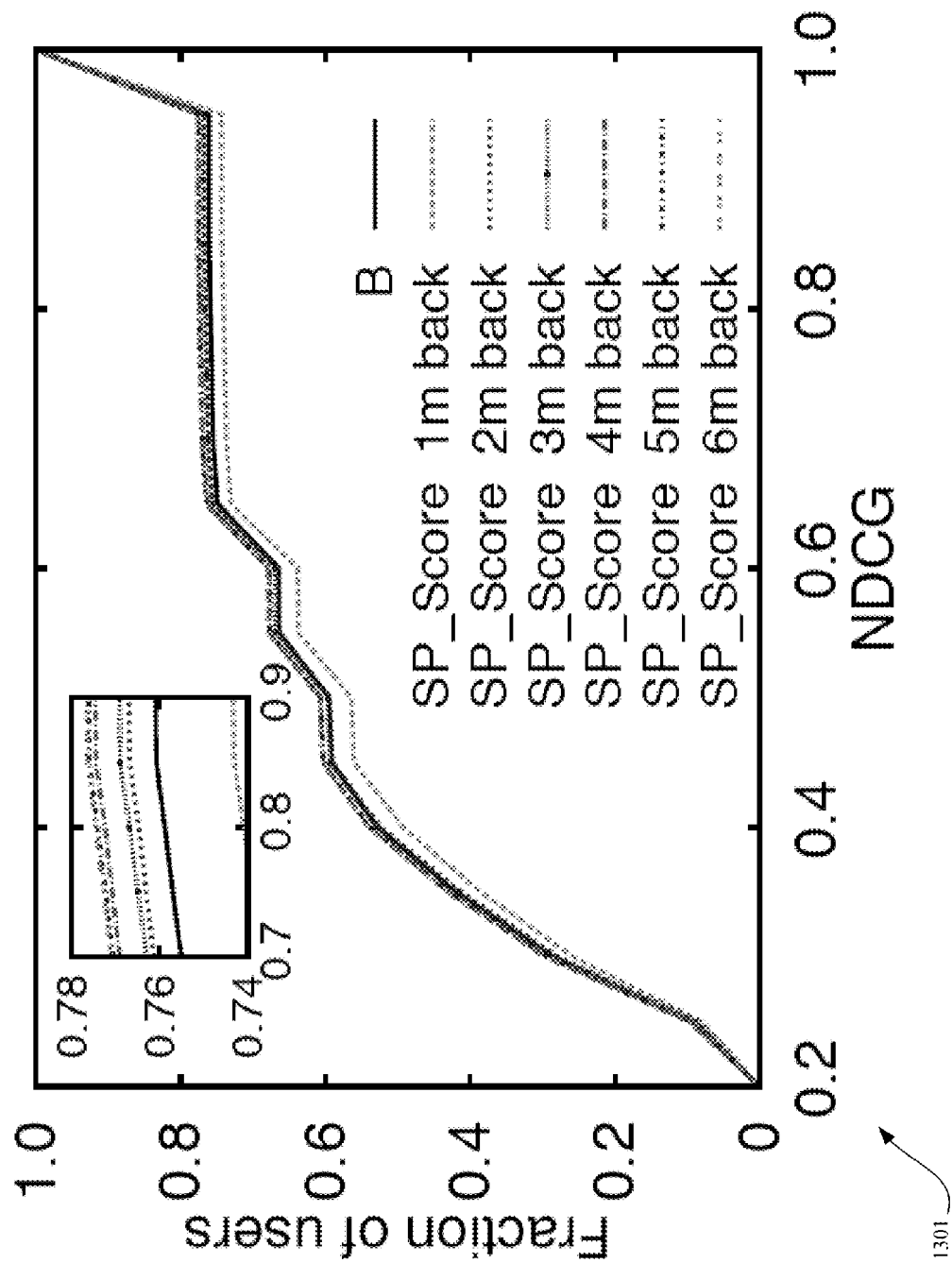
FIG. 13A is a plot showing the relative performance of news personalization using score aggregation plotted against recency.

Plot 1301 in FIG. 13A shows the performance of news personalization using score aggregation (SP Score) with a web-search profile based on queries and titles (e.g., U) plotted against recency of search web-search profile. To determine recency, a time window of one month is set and the time window is slid back from the test day month-to-month, up to six months. So for example, assuming Jan. 1, 2014, as the test day, a recency of one month includes all the queries issued in December, 2013, a recency of two months includes all queries issued in November, 2013, and a recency of six months includes all queries issued in July, 2013. Here, most of the rankings for the SP Score combination did not out-perform the news-service profiles (B) with an average NDCG for B equal to 0.522, an average NDCG for SP Score using a one-month recency equal to 0.54, an average NDCG for SP Score using a two-month recency equal to 0.521, an average NDCG for SP Score using a three-month recency equal to 0.518, an average NDCG for SP Score using a four-month recency equal to 0.512, an average NDCG for SP Score using a five-month recency equal to 0.512, and an average NDCG for SP Score using a six-month recency equal to 0.511. It will be appreciated that the SP Score combination using a one-month recency did outperform B.

Figure 13B:
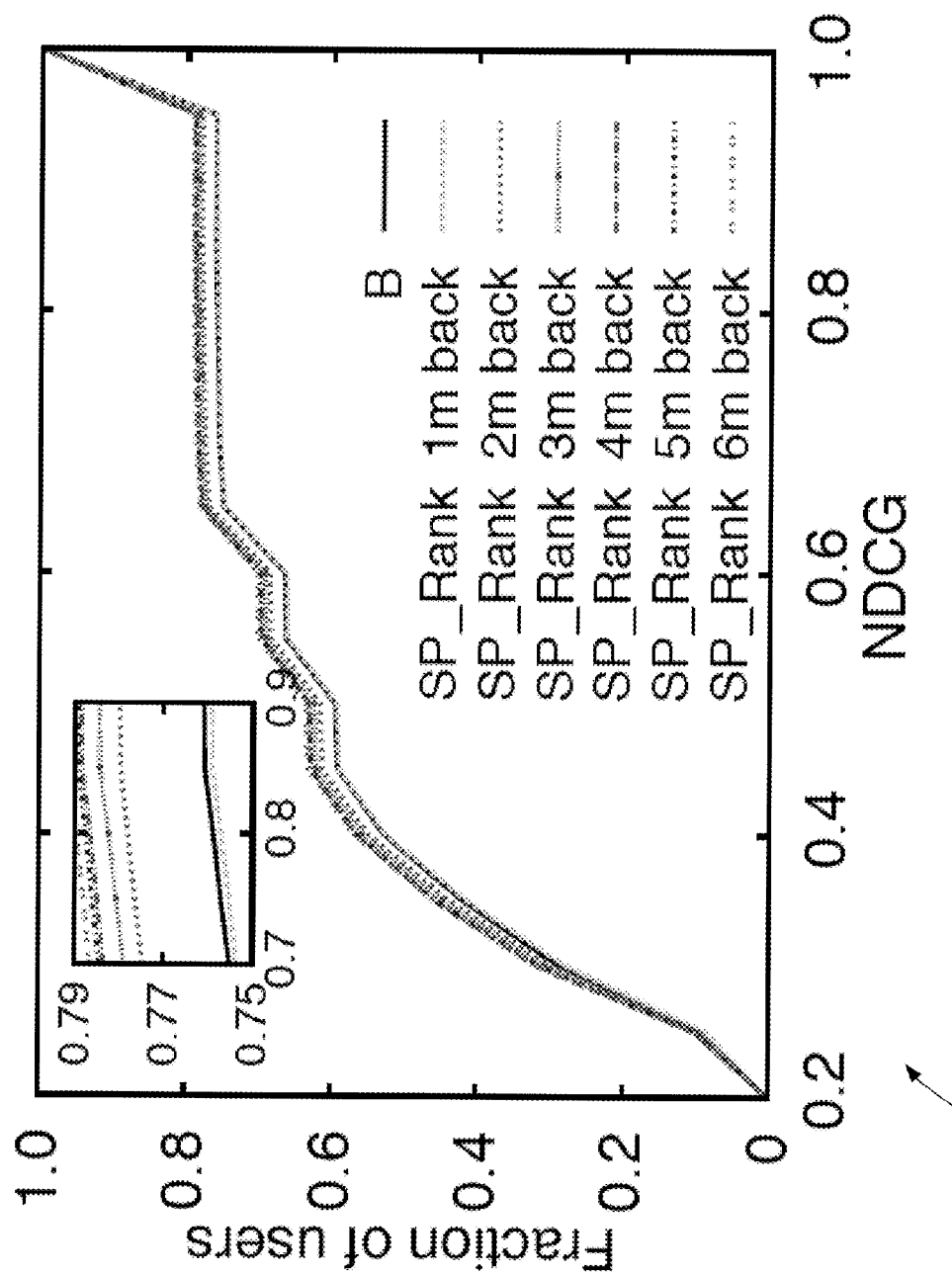
FIG. 13B is a plot showing the relative performance of news personalization using rank aggregation plotted against recency.

Plot 1302 in FIG. 13B shows the performance of news personalization using rank aggregation (SP Rank) with a web-search profile based on queries and titles (e.g., $U_t$) plotted against recency of web-search profile. Here again, most of the rankings for the SP Rank combination did not out-perform the news-service profiles (B) with an average NDCG for B equal to 0.522, an average NDCG for SP Rank using a one-month recency equal to 0.524, an average NDCG for SP Score using a two-month recency equal to 0.508, an average NDCG for SP Rank using a three-month recency equal to 0.503, an average NDCG for SP Rank using a four-month recency equal to 0.498, an average NDCG for SP Rank using a five-month recency equal to 0.498, and an average NDCG for SP Rank using a six-month recency equal to 0.496. It will be appreciated that SP Rank combination using a one-month recency did outperform B.

More generally, it will be appreciated that the above test results indicate that exogenous web-search profiles appear to cover interests of users that are orthogonal to or not covered by the interests covered by the endogenous news-service profiles. Those interests might be relatively more ephemeral, e.g., as indicated by the recency tests. Or they might be relatively more persistent, as indicated by the training-period tests.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, similarity might be determined using a "bag of images/videos" and/or a "bag of audios" rather than a "bag of words", in example embodiments. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, which is computer-implemented, comprising operations of:

generating a first profile for a user of a news service, wherein the first profile is based at least in part on implicit relevance feedback from the user on content presented by the news service;

obtaining a second profile for the user from a web-searching service, wherein the second profile is based on a query log with a plurality of queries by the user during a specified period of time and any search results resulting from each of the plurality of queries;

generating a first relevancy score defining how well a candidate item of content matches the first profile;

generating a second relevancy score defining how well the candidate item of content matches the second profile;

creating a combined score for the candidate item of content using score aggregation, wherein the combined score is based at least in part on similarity of the candidate item to the first profile as provided in the first relevancy score and similarity of the candidate item to the second profile as provided in the second relevancy score, and wherein similarity to the second profile measures at least similarity to each of the queries and similarity to any titles of any search results resulting from each of the queries, wherein score aggregation comprises combining the first relevancy score and the second relevancy score;

generating a final ranking for the candidate item based on the combined score, wherein the higher the combined score the more relevant the candidate item of content is to the user as reflected in the final ranking; and presenting the candidate item of content to the user in a content stream served by the news service, based at least in part on the combined score and the final ranking.

2. The method of claim 1, where the implicit relevance feedback includes click-throughs, click-ons, or both click-throughs and click-ons.

3. The method of claim 1, wherein the user has expressly consented to use of the second profile when creating the score.

4. The method of claim 1, wherein similarity is measured using cosine similarity and vectors of unigrams.

5. The method of claim 4, further comprising an operation of:
rescaling the second profile using an inverse document frequency (IDF) function.

6. The method of claim 1, wherein the query log logs at least three months of queries and results.

7. The method of claim 1, wherein the user is an inactive user.

8. The method of claim 1, wherein similarity to the second profile additionally measures similarity to an abstract or snippet of a search result.

9. One or more computer-readable media which are non-transitory and which store instructions that, when executed by a processor, perform the following operations:
generate a first profile for a user of a website with multiple services including a news service and a web-searching service, wherein the first profile is based at least in part on implicit relevance feedback from the user on content presented by the news service;

obtain a second profile for the user from a web-searching service, wherein the second profile is based on a query log with a plurality of queries by the user during a specified period of time and any search results resulting from each of the plurality of queries;

generate a first relevancy score defining how well a candidate item of content matches the first profile;

generate a second relevancy score defining how well the candidate item of content matches the second profile;

create a combined score for the candidate item of content using score aggregation, wherein the combined score is based at least in part on similarity of the candidate item to the first profile as provided in the first relevancy score and similarity of the candidate item to the second profile as provided in the second relevancy score, and wherein similarity to the second profile measures at least similarity to each of the queries and similarity to any titles of any search results resulting from each of the queries, wherein score aggregation comprises combining the first relevancy score and the second relevancy score;

generate a final ranking for the candidate item based on the combined score, wherein the higher the combined score the more relevant the candidate item of content is to the user as reflected in the final ranking; and present the candidate item of content to the user in a content stream served by the news service, based at least in part on the combined score and the final ranking.

10. The computer-readable media of claim 9, where the implicit relevance feedback includes click-throughs, click-ons, or both click-throughs and click-ons.

11. The computer-readable media of claim 9, wherein the user has expressly consented to use of the second profile when creating the score.

12. The computer-readable media of claim 9, wherein similarity is measured using cosine similarity and vectors of unigrams.

13. The computer-readable media of claim 12, further comprising an operation of:
rescale the second profile using an inverse document frequency (IDF) function.

14. The computer-readable media of claim 9, wherein the query log logs at least three months of queries and results.

15. The computer-readable media of claim 9, wherein the user is an inactive user.

16. The computer-readable media of claim 9, wherein similarity to the second profile additionally measures to an abstract or snippet of a search result.

17. A method, which is computer-implemented, comprising operations of:
generating a first profile for a user of a social-networking service, wherein the first profile is based at least in part on implicit relevance feedback from the user on content presented by the social-networking service;

obtaining a second profile for the user from a web-searching service, wherein the second profile is based on a query log with a plurality of queries by the user during a specified period of time and any search results resulting from each of the plurality of queries;

generating a first relevancy score defining how well a candidate item of content matches the first profile;

generating a second relevancy score defining how well the candidate item of content matches the second profile;

creating a combined score for the candidate item of content using score aggregation, wherein the combined score is based at least in part on similarity of the candidate item to the first profile as provided in the first relevancy score and similarity of the candidate item to the second profile as provided in the second relevancy score, and wherein similarity to the second profile measures at least similarity to each of the queries and similarity to any titles of any search results resulting from each of the queries, wherein score aggregation comprises combining the first relevancy score and the second relevancy score;

generating a final ranking for the candidate item based on the combined score, wherein the higher the combined score the more relevant the candidate item of content is to the user as reflected in the final ranking; and presenting the candidate item of content to the user in a content stream served by the social-networking service, based at least in part on the combined score and the final ranking.

18. The method of claim 17, where the implicit relevance feedback includes likes, shares, or both likes and shares.

19. The method of claim 17, wherein the query log logs at least three months of queries and results.

20. The method of claim 17, wherein similarity to the second profile additionally measures similarity to an abstract or snippet of a search result.

* * * * *